US008069412B2

(12) United States Patent
Bankston et al.

(10) Patent No.: US 8,069,412 B2
(45) Date of Patent: Nov. 29, 2011

(54) METHODS, SYSTEMS, AND PRODUCTS FOR MAPPING FACILITIES DATA

(75) Inventors: Deborah F. Bankston, Smyrna, GA (US); M. W. Rick Vinson, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 934 days.

(21) Appl. No.: 11/901,597

(22) Filed: Sep. 17, 2007

(65) Prior Publication Data

US 2008/0092061 A1 Apr. 17, 2008

Related U.S. Application Data

(60) Provisional application No. 60/852,182, filed on Oct. 17, 2006.

(51) Int. Cl.
*G06F 17/00* (2006.01)
(52) U.S. Cl. ........................................ 715/255
(58) Field of Classification Search .................. 715/273, 715/255, 784, 200; 705/29
See application file for complete search history.

(56) References Cited

U.S. PATENT DOCUMENTS

| | | | | |
|---|---|---|---|---|
| 5,687,212 A * | 11/1997 | Kinser et al. | ................ | 379/9.03 |
| 5,790,634 A | 8/1998 | Kinser, Jr. | | |
| 5,908,465 A * | 6/1999 | Ito et al. | ........................ | 701/211 |
| 5,920,846 A | 7/1999 | Storch | | |
| 5,953,485 A | 9/1999 | Abecassis | | |
| 6,006,096 A * | 12/1999 | Trompower | ............... | 455/456.2 |
| 6,035,253 A * | 3/2000 | Hayashi et al. | ............... | 701/211 |
| 6,268,802 B1 * | 7/2001 | Foladare et al. | ............... | 340/7.2 |
| 6,282,493 B1 * | 8/2001 | Kitagawa et al. | ............ | 701/211 |
| 6,553,310 B1 * | 4/2003 | Lopke | ......................... | 701/213 |
| 6,668,227 B2 * | 12/2003 | Hamada et al. | ............... | 701/208 |
| 6,810,415 B2 | 10/2004 | Allen | | |
| 6,957,266 B2 | 10/2005 | Evans | | |
| 7,216,153 B2 * | 5/2007 | Allen et al. | .................... | 709/218 |
| 7,239,964 B2 * | 7/2007 | Takizawa | ...................... | 701/211 |
| 7,346,451 B2 * | 3/2008 | Sakashita et al. | ............ | 701/208 |
| 7,580,789 B2 * | 8/2009 | Nomura | ........................ | 701/201 |
| 7,773,095 B1 * | 8/2010 | Badrak et al. | ................. | 345/619 |
| 7,788,189 B2 * | 8/2010 | Budike, Jr. | ................... | 705/400 |
| 2002/0023109 A1 * | 2/2002 | Lederer et al. | ............... | 707/511 |
| 2002/0099742 A1 * | 7/2002 | Antley et al. | ................. | 707/530 |
| 2003/0195700 A1 * | 10/2003 | Hamada et al. | ............... | 701/208 |
| 2003/0197642 A1 * | 10/2003 | Smith | ........................... | 342/360 |
| 2003/0202645 A1 * | 10/2003 | Naik et al. | ................. | 379/201.1 |
| 2003/0202767 A1 * | 10/2003 | Glynn | ........................... | 385/135 |
| 2004/0107211 A1 * | 6/2004 | Kite et al. | ................. | 707/104.1 |
| 2004/0204843 A1 * | 10/2004 | Hayama et al. | ............... | 701/209 |
| 2004/0243453 A1 * | 12/2004 | Call et al. | ........................... | 705/7 |
| 2005/0021513 A1 * | 1/2005 | Vedula et al. | ..................... | 707/3 |
| 2005/0259694 A1 | 11/2005 | Garudadri et al. | | |
| 2005/0286509 A1 | 12/2005 | Iwamura | | |

(Continued)

OTHER PUBLICATIONS

Inova, TeleCAD-GIS, Google 2002, pp. 1-3.*

(Continued)

*Primary Examiner* — Cong-Lac Huynh
(74) *Attorney, Agent, or Firm* — Scott P. Zimmerman PLLC

(57) ABSTRACT

Methods, systems, and products are disclosed for mapping facilities data. A graphical mapping of facilities information, overlaid onto a map of roads, is generated and displayed. An outer perimeter of a geographic area is defined, and the outer perimeter is displayed in the graphical mapping. A bill of materials that corresponds to the outer perimeter is then generated.

18 Claims, 40 Drawing Sheets

U.S. PATENT DOCUMENTS

| | | | | |
|---|---|---|---|---|
| 2006/0173953 | A1* | 8/2006 | Salzsauler | 709/203 |
| 2006/0256792 | A1 | 11/2006 | Kwong et al. | |
| 2007/0016651 | A1* | 1/2007 | Blagsvedt et al. | 709/217 |
| 2007/0067103 | A1* | 3/2007 | Fukumoto et al. | 701/211 |
| 2007/0156661 | A1* | 7/2007 | Allen et al. | 707/3 |
| 2007/0228145 | A1* | 10/2007 | Diemer | 235/379 |
| 2007/0250265 | A1* | 10/2007 | Mori | 701/211 |
| 2007/0282781 | A1* | 12/2007 | Mathiesen et al. | 707/1 |
| 2008/0069144 | A1* | 3/2008 | Yu et al. | 370/476 |
| 2008/0162031 | A1* | 7/2008 | Okuyama et al. | 701/200 |
| 2008/0294496 | A1* | 11/2008 | Hall et al. | 705/10 |
| 2010/0010875 | A1* | 1/2010 | Armstrong et al. | 705/10 |
| 2010/0037264 | A1* | 2/2010 | Hardacker et al. | 725/51 |

OTHER PUBLICATIONS

Deshpande et., Telecom GIS: An Integrated Approach, Google 2003, pp. 1-7.*

Cuunts, The Impact of Geography on Network Engineering, Google 2005, pp. 1-16.*

Ritchie et al., Immersive Virtual Reality as An Interactive Tool for Cable Harnesses Design, Google 2002, pp. 1-6.*

Poon et al., Successful Application of Genetic Algorithm to Network Design and Planning, Google 2000, pp. 32-41.*

Poon et al., Successful Application of Genetic Algorithms to Network Design and Planning, Google 2000, pp. 32-41.*

Asamu et al., Performance in Planning—Smart Systems for the Access Network, Google 1998, pp. 138-151.*

Code of Federal Regulations, Title 47, Telecommunication Chapter I, FCC Subchapter B-Common Carrier Services, Part 64, Misc. Rules Relating to Common Carriers, pp. 1-16.

National Communications System, NCS Directive 2-1, Plans, Programs, and Fiscal Management, NSEP Telecommunications Planning Process, Sep. 30, 1988, pp. 1-19.

DHS: Homeland Security Deploys Massive Response and Recovery Effort for Isabel; https://www.dhs.gov/xnews/releases/press_release_0254.shtm; Sep. 19, 2003; p. 1.

DHS: Massive Homeland Security Response Ready to Meet Hurricane Victim Needs as Secretary Ridge Visits Impacted Areas; https://www.dhs.gov/xnews/releases/press_release_0257.sh.

Telecommunications Section; http://emd.wa.gov/1-dir/com/com-ids.htm; pp. 1-4.

Internet Security News: [ISN] IT Managers Brace for Isabel; InfoSec News; Sep. 18, 2003; pp. 1-3.

Streaming MultiMedia Data, Team Solutions, www.teamsolutions.co.uk/streaming.html, Nov. 27, 2006.

C.F.R.; Title 47—Telecommunication Chapter I; Federal Communications Commission; Subchapter B—Common Carrier Services; Pt. 64; current through Nov. 6, 2001; pp. 1-16.

National Communications System; NCS Directives and Manuals; http://www.ncs.gov/directives.html; Dec. 7, 2006, p. 1.

Department of Homeland Security; Sector-Specific Plans to Protect Critical Infrastructure Announced; http://www.dhs.gov/index.shtm; pp. 1-2.

* cited by examiner

Prior Art

FIG. 33

METHODS, SYSTEMS, AND PRODUCTS FOR MAPPING FACILITIES DATA

CROSS REFERENCE TO RELATED APPLICATIONS

This application claims the benefit of U.S. Provisional Application No. 60/852,182, filed Oct. 17, 2006 and entitled "Mobile Mapping Tool", which is incorporated herein by reference in its entirety. This application also relates to the commonly assigned U.S. application Ser. No. 11/901,607, entitled "Methods, Systems, and Products For Surveying Facilities", and which is incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

Exemplary embodiments generally relate to mapping of information and, more particularly, to mapping of facilities and equipment information for any industry.

Accurate and simple facilities information may be difficult to obtain. Many industries maintain diverse and/or remote plants, operations, and equipment. Significant efforts and financial investments are made to maintain accurate information on these facilities and equipment. Still, though, the information may be difficult to access and to interpret. Different facilities may utilize different communications networks and equipment, thus complicating efforts to unify all the facilities information. Moreover, the volume of facilities and equipment information may be too difficult to access and effectively utilize. When personnel cannot obtain accurate facilities information, repair efforts may be delayed.

In the communications industry, for example, there may be millions of different circuits. These circuits route calls and other Internet traffic throughout a city, state, and even the nation. When a circuit fails, or becomes congested, communications data must be rerouted to alternate circuits. Accurate and readily accessible information, then, must be maintained for all these circuit facilities. Sometimes, however, facility information is stored in a database that is unavailable or incompatible. When communications personnel have trouble accessing or sharing information, coordination of repair efforts is hampered and/or delayed. Whatever the industry, then, personnel must be able to quickly and easily obtain facilities and equipment information.

SUMMARY

Exemplary embodiments provide methods, systems, and products for mapping facilities data with geographic data. This facilities data describes equipment, components, physical plants, and structures for any industry. The facilities data may be overlaid onto a map of roads to generate a graphical mapping. When this graphical mapping is displayed, an outer perimeter of a geographic area may be defined, and the outer perimeter may displayed in the graphical mapping. Exemplary embodiments may then generate a bill of materials that corresponds to the outer perimeter. This bill of materials provides a listing of all the facilities data location within the geographic area.

More exemplary embodiments include a system for mapping facilities data. The system includes means for generating a graphical mapping of the facilities data overlaid onto a map of roads. The system also includes means for defining an outer perimeter of a geographic area. Means are included for generating a bill of materials that corresponds to the outer perimeter.

Still more exemplary embodiments include a computer program product for mapping facilities data. The computer program product includes processor-executable instructions for generating a graphical mapping of the facilities data overlaid onto a map of roads. When this graphical mapping is displayed, an outer perimeter of a geographic area may be defined, and the outer perimeter may displayed in the graphical mapping. Exemplary embodiments may then generate a bill of materials that corresponds to the outer perimeter.

Other systems, methods, and/or computer program products according to exemplary embodiments will be, or will become, apparent to one with ordinary skill in the art upon review of the following drawings and detailed description. It is intended that all such additional systems, methods, and/or computer program products be included within this description, be within the scope of the claims, and be protected by the accompanying claims.

DESCRIPTION OF THE DRAWINGS

These and other features, aspects, and advantages of the exemplary embodiments are better understood when the following Detailed Description is read with reference to the accompanying drawings, wherein:

FIGS. 14-17 are still more screen shots illustrating additional search features, according to exemplary embodiments;

FIGS. 20-24 are screenshots illustrating loop make-up features, according to exemplary embodiments;

FIGS. 31-33 are screenshots illustrating capabilities for generating a geographic-specific bill of materials, according to more exemplary embodiments;

DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
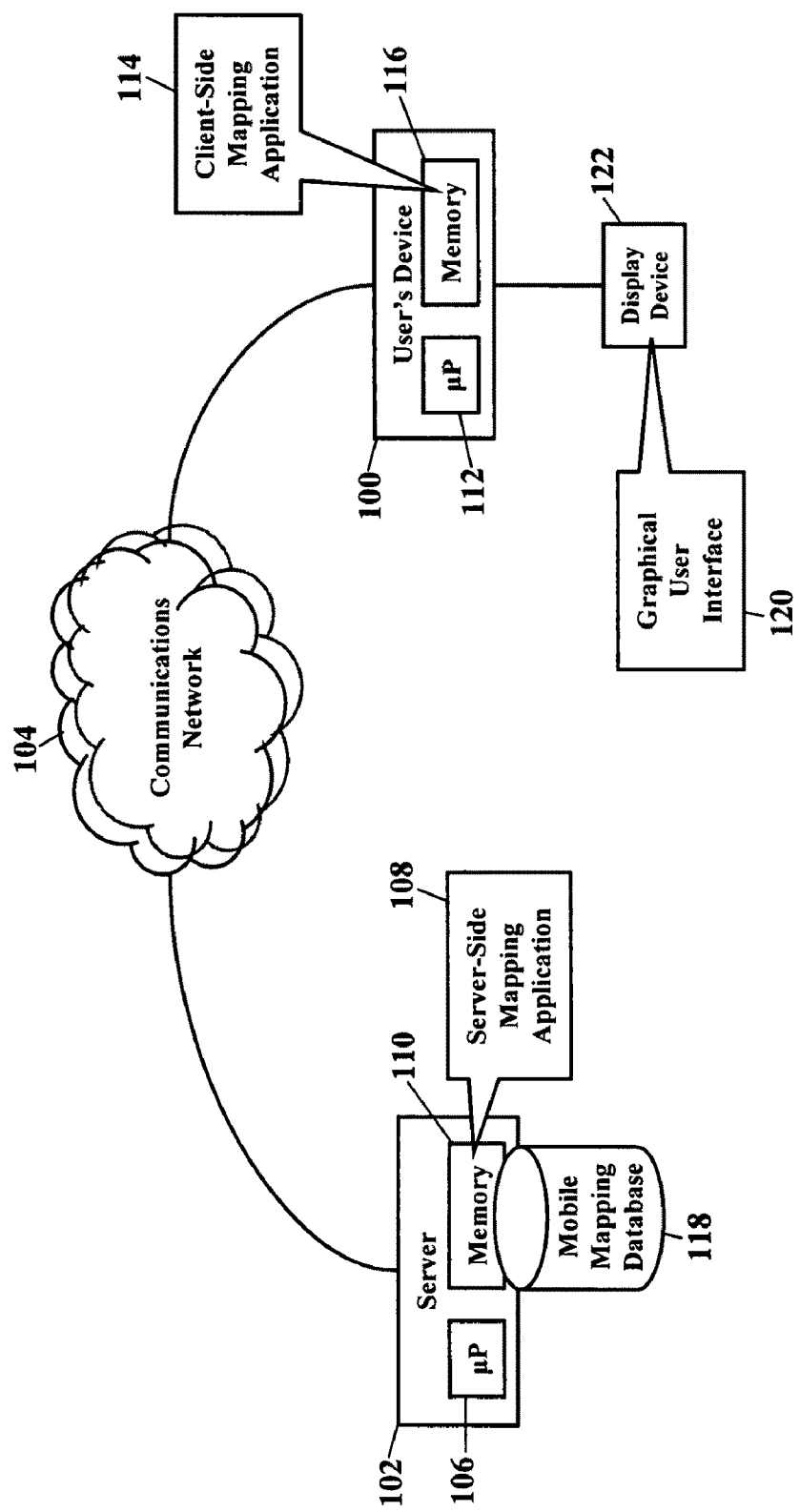
FIG. 1 is a simplified schematic illustrating an operating environment, according to exemplary embodiments.

FIG. 1 is a simplified schematic illustrating an operating environment, according to exemplary embodiments. A user's device 100 communicates with a server 102 via a communications network 104. Although the user's device 100 is generically shown, the device 100, as will be later explained, may be a computer, a radio, a personal digital assistant (PDA), a cordless/cellular/IP phone, digital music player, or any other device. The server 102 has a processor 106 (e.g., "μP"), application specific integrated circuit (ASIC), or other device that executes a server-side mapping application 108 stored in memory 110, according to exemplary embodiments. The user's device 100 may also have a processor 112 (e.g., "μP"), application specific integrated circuit (ASIC), or other device that executes a client-side mapping application 114 stored in memory 116. The user's device 100 and/or the server 102 may also communicate with a mobile mapping database 118. The mobile mapping database 118 is illustrated as being locally stored in the memory 116 of the server 102, yet the mobile mapping database 118 may be remotely stored and accessed from any node or device in the communications network 104. The server-side mapping application 108 and/or the client-side mapping application 114 may cooperate to cause the user's device 100 to generate a graphical user interface 120. The graphical user interface 120 is illustrated as being visually produced on a display device 122, yet the graphical user interface 120 may also have audible features. As the following paragraphs will explain, the server-side mapping application 108 and/or the client-side mapping application 114 may be sets of processor-executable instructions that cooperate to cross-reference geographic mapping data with detailed facility data. The server-side mapping application 108 and the client-side mapping application 114 thus may operate in a client-server environment that supports object oriented technology, messaging, transactions, security, system management, and/or reporting. Exemplary embodiments, however, may be implemented in a client-based application, where all software and/or logic operate in a client device (e.g., the user's device 100).

Figure 2:
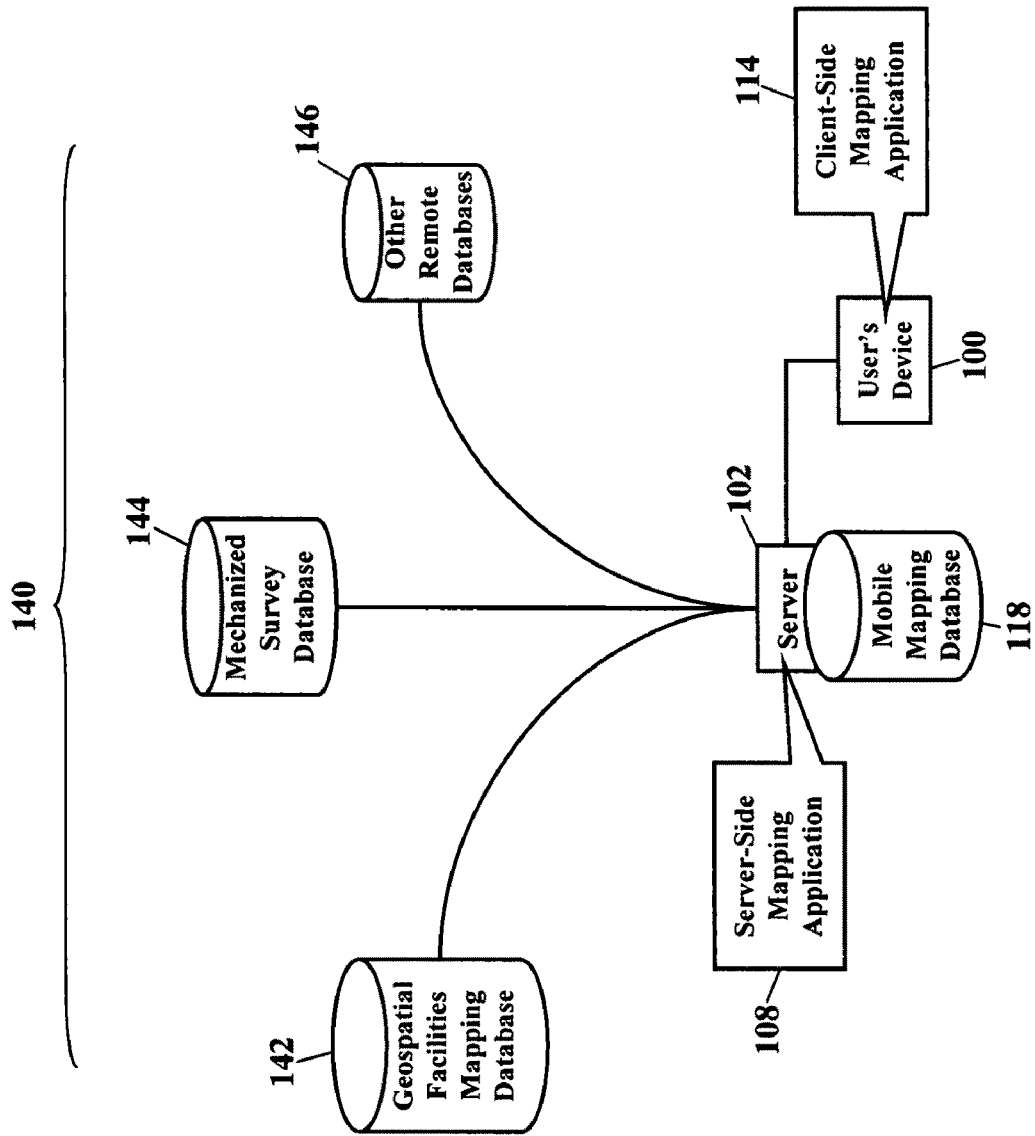
FIG. 2 is a schematic illustrating a more detailed operating environment, according to more exemplary embodiments.

FIG. 2 is a schematic illustrating a more detailed operating environment, according to more exemplary embodiments. Here the user (at the user's device 100) may interact with the client-side mapping application 114 to access the server-side mapping application 108 operating in the server 102. The user may navigate through one or more user interfaces to login and/or to access the client-side mapping application 114 and/or the server-side mapping application 108. Exemplary embodiments may first require an authentication procedure (e.g., username and password) to limit access to authorized users. When the user is authenticated, the user may be presented with a home page or screen. The home page or screen may also contain fields and/or queries for other information. This information can be used by other executable programs. This home page or screen may also contain global scripts that are used throughout the client-side 114 and/or the server-side 108 applications, according to exemplary embodiments. These global scripts may remain open and operating "behind the scenes" so that these scripts are available for use. Alternatively, when portions of both the client-side 114 and/or the server-side 108 applications reside on a stand alone client workstation, then the user may not interface with an online component and may not require a security check.

Exemplary embodiments may interact with additional databases 140. These additional databases 140 are queried to obtain information that is presented to the user at the user's device 100 (via the graphical user interface 120 and display device 122 illustrated in FIG. 1). A geospatial facilities mapping database 142, for example, may be accessed when plotting and/or editing data in mapping environments. The geospatial facilities mapping database 142, for example, may be a BENTLEY° POWERMAP® database (BENTLEY® and POWERMAP® are registered trademarks of Bentley Systems, Inc.). The geospatial facilities mapping database 142 may include a master database that captures a facilities snapshot of a selected geographic area. This geographic area, for example, may include information for a selected communications circuit as well as information for other circuits within a given or selected radius or distance). Exemplary embodiments, however, may utilize any source, vendor, or provider of geographic facilities and/or mapping data. A mechanized survey database 144 stores electronic data that facilitates selection and input of constraints, controls, and/or automation features to improve the accuracy or detail of the selected circuit and associated network components, according to exemplary embodiments. The server 102 may also interact with any other databases (such as a generically designated remote database 146). These additional databases 140 allow the client-side mapping application 114, the server-side mapping application 108, and/or the mobile mapping database 118 to selectively access, manage, manipulate, and/or store detailed hardware and equipment information, facility location information, and mapping data. These additional databases 140 are illustrated as being remotely located from the server 102 and from the user's device 100, yet any of the additional databases 140 may be locally stored in the user's device 100 and/or the server 102. These additional databases 140 are also known to those of ordinary skill in the art and, thus, not described in detail.

The user's device 100 and the server 102 are only simply illustrated. Because the architecture and operating principles of the user's device 100 and the server 102 are well known, the hardware and software components of these devices are not further shown and described. If the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 104 may be a cable network operating in the radio-frequency domain and/or the Internet Protocol (IP) domain. The communications network 104, however, may also include a distributed computing network, such as the Internet (sometimes alternatively known as the "World Wide Web"), an intranet, a local-area network (LAN), and/or a wide-area network (WAN). The communications network 104 may include coaxial cables, copper wires, fiber optic lines, and/or hybrid-coaxial lines. The communications network 104 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

FIGS. 3-38 are schematics further illustrating the graphical user interface 120, according to more exemplary embodiments. As the above paragraphs explained, the server-side mapping application 108 (and/or the client-side mapping application 114) queries the mobile mapping database 118 to obtain information. The server-side mapping application 108 and/or the client-side mapping application 114 may also query the additional databases 140 to obtain various other types of information. The server-side mapping application 108 and/or the client-side mapping application 114 then assemble, compile, and/or format all this information for visual and/or audible presentation at the user's device 100 (via the display device 122 illustrated in FIG. 1). The information, for example, is presented as the graphical user interface 120, and various versions of the graphical user interface 120 are illustrated in FIGS. 3-38. The graphical user interfaces 120 illustrated in FIGS. 3-38, however, are tailored to the communications industry. Exemplary embodiments, however, may be tailored to any industry or any service provider. That is, for example, exemplary embodiments may be adapted to map facilities data with geographic mapping data for industrial facilities, private or public network facilities, water facilities, electric facilities, and road and highway departments. Exemplary embodiments, then, should not be limited to the communications industry.

Figure 3:
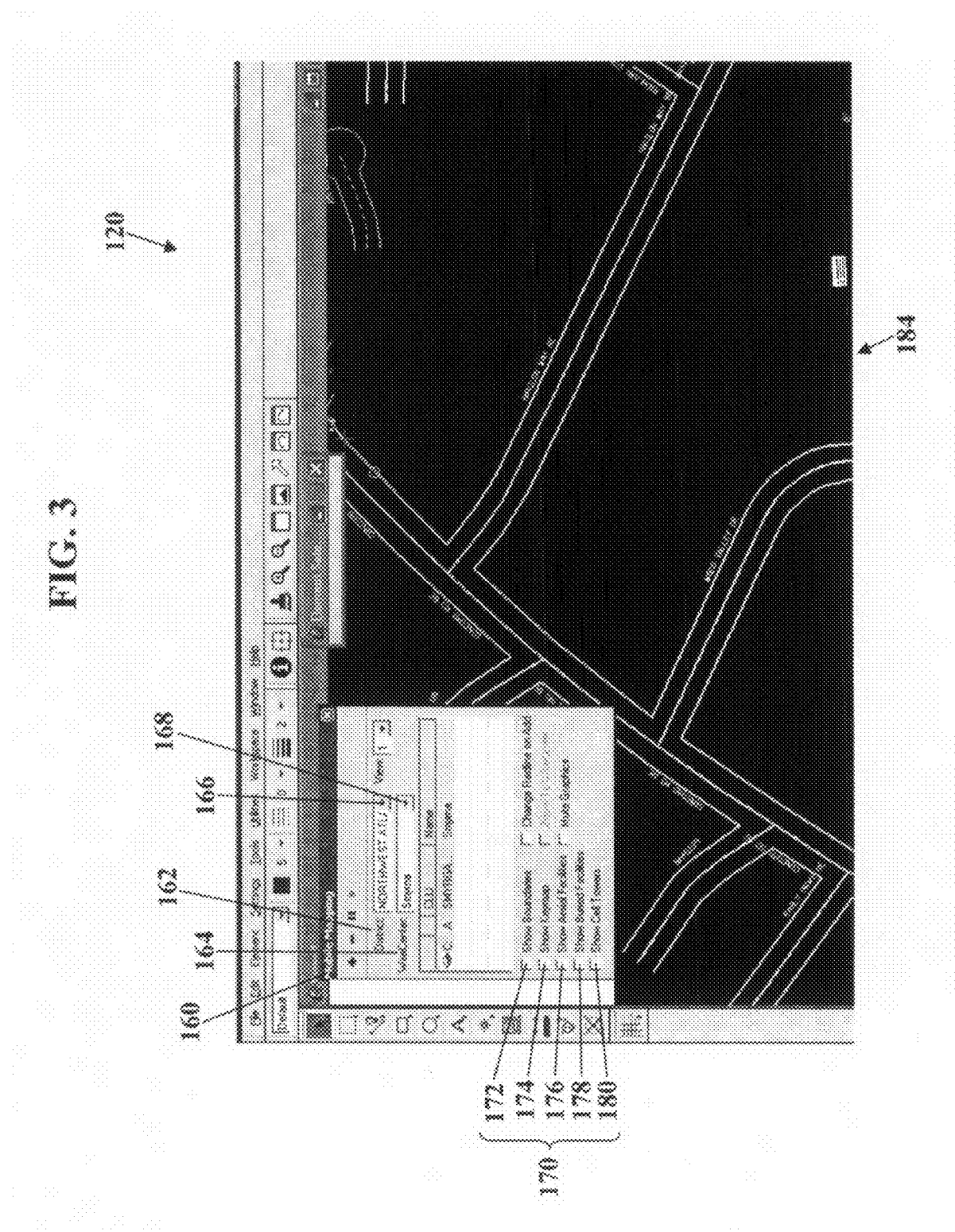
FIGS. 3-4 are screenshots of a graphical user interface, according to exemplary embodiments.

FIG. 3, for example, is a screenshot of a graphical user interface 120, according to exemplary embodiments. The graphical user interface 120 may include a dialog box 160 that allows the user to select what data is presented. Here, because the graphical user interface 120 is tailored to the communications industry, the user selects what data is displayed for a particular district 162 and wire center 164. That is, the dialog box 160 may have a control 166 that, when selected, produces a drop down menu for selecting the district 162. Another control 168, when selected, produces a drop down menu for selecting the wire center 164. The district 162 and wire center 164 are geographic designations in the communications industry. Exemplary embodiments, however, may permit selection of any geographic area, region, or zone for any industry or purpose. Regardless, once the user selects the desired district 162 and wire center 164, the user may then select or deselect various data sets 170 for that particular district 162 and wire center 164. As FIG. 3 illustrates, the user may select to show a boundaries option 172, a keymaps option 174, an aerial facilities option 176, a buried facilities option 178, and a cellular towers option 180. Here, then, the graphical user interface 120 provides many capabilities for filtering data. The user may choose which of the data sets 170 is displayed, without cluttering the display with unwanted information. Suppose, for example, that the user is only interested in facilities and equipment that may be damaged by high winds from a hurricane situation. Windy conditions may not affect buried facilities, so the user may wish to turn off (or "hide") the buried facilities option 178. That is, the user may only care to show aerial facilities (e.g., cables and poles) and may not wish to view unaffected underground facilities. Likewise, if the user is working with a congested facilities area (such as a metropolitan or urban area), the user may turn off or hide certain data sets to simplify the display.

FIG. 3, then, illustrates one of the simplest views. In the dialog box 160, none of the optional data sets 170 are displayed. That is, the boundaries option 172, the keymaps option 174, the aerial facilities option 176, the buried facilities option 178, and the cellular towers option 180 are all deselected and, thus, not displayed. The graphical user interface 120 thus produces only a graphical map 184 of roads associated with the desired district 162 and wire center 164.

Figure 4:
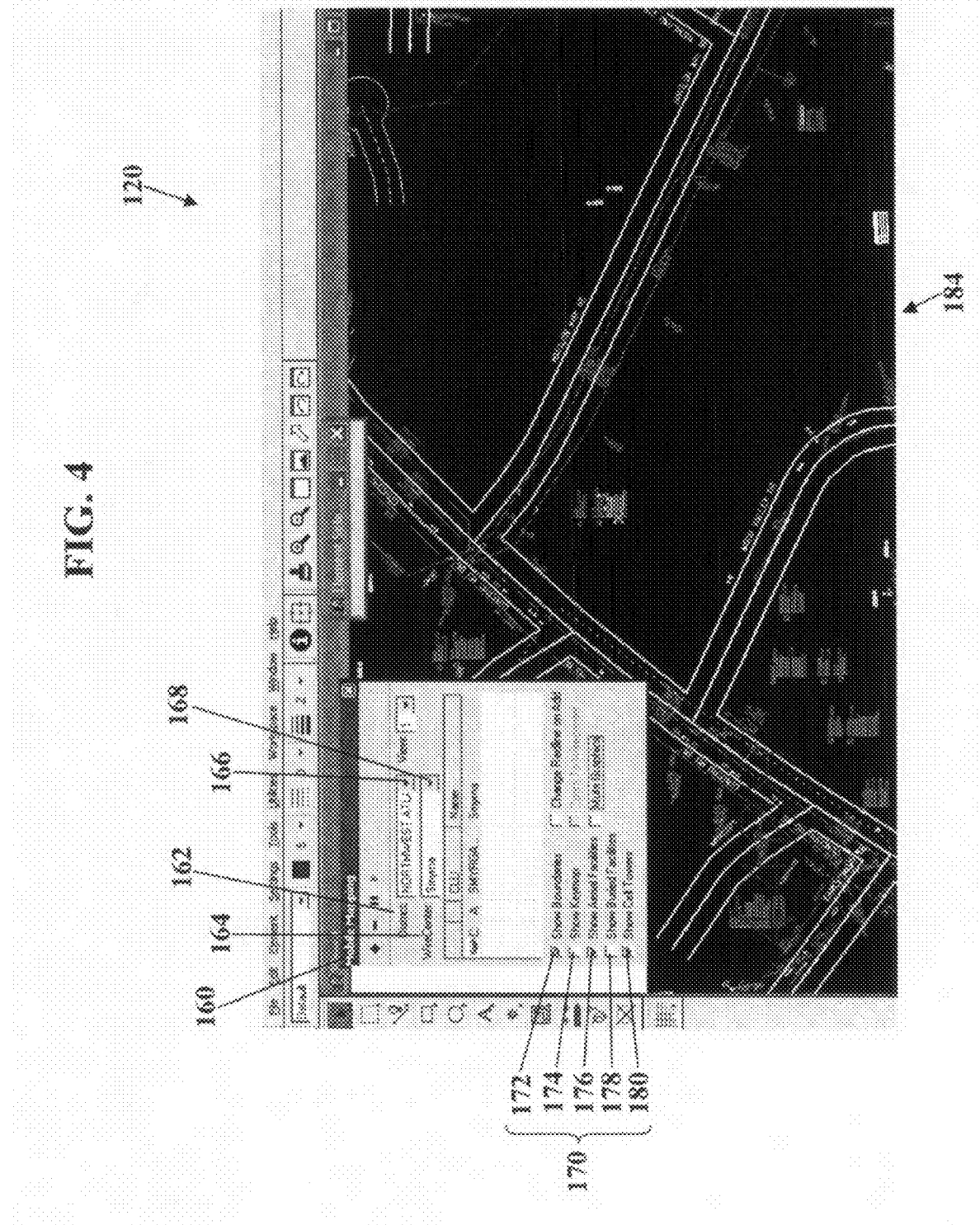

FIG. 4, however, illustrates a visual presentation of the data sets 170. Here the user has selected to show some of the data sets 170 for the district 162 and wire center 164. In the dialog box 160 the user has select to show the boundaries option 172, the aerial facilities option 176, and the cellular towers option 180. When the user selects these data sets, the server-side mapping application 108 and/or the client-side mapping application 114 retrieve and cause a visual presentation of these selected data sets. The graphical user interface 120 is updated or refreshed to visually produce the selected data sets. FIG. 4, then, illustrates boundaries, aerial facilities, and cellular towers overlaid onto the graphical map 184 of roads. Exemplary embodiments thus permit very easy manipulation and display of various data sets, regardless of the industry.

Figure 5:
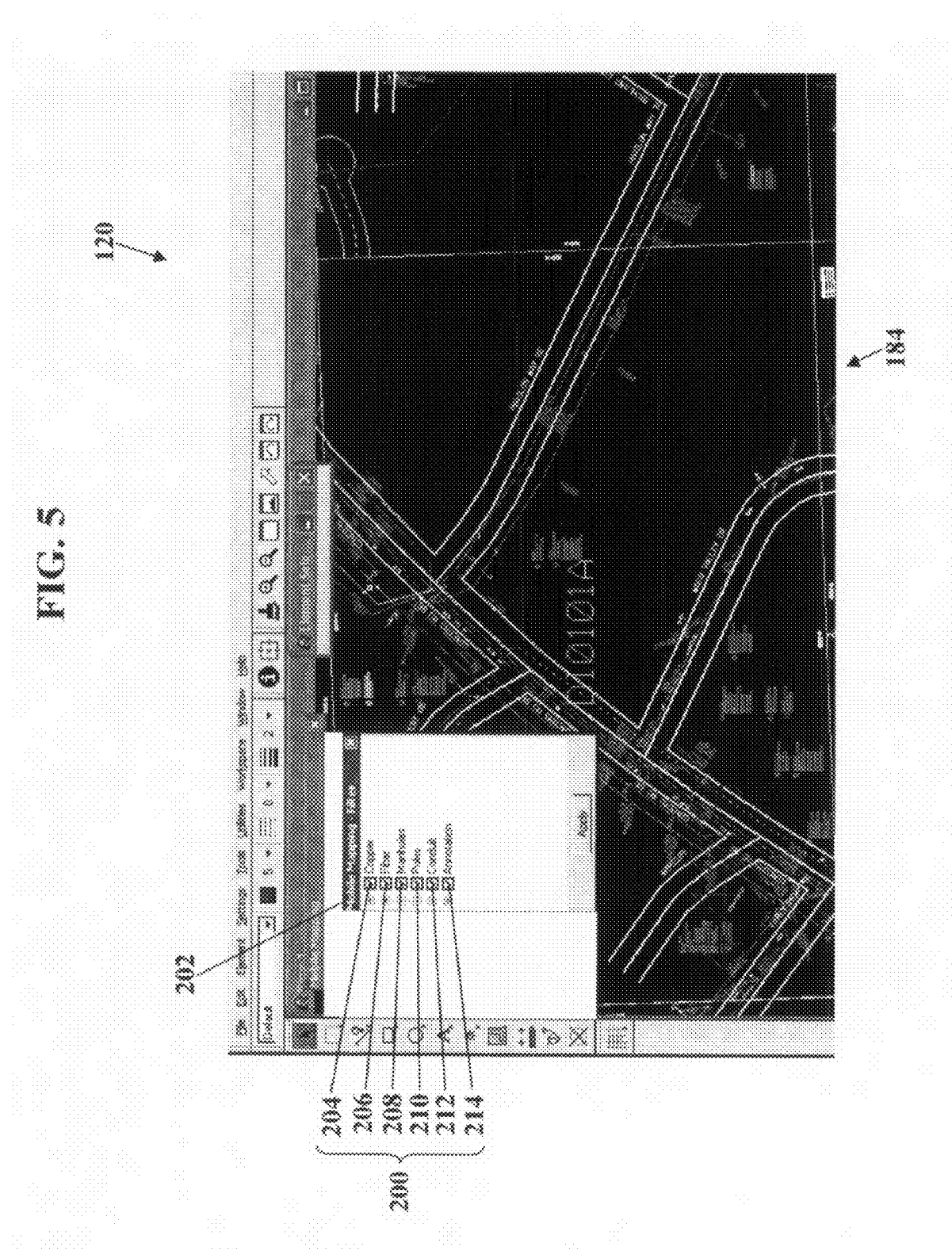
FIGS. 5-7 are more screenshots illustrating additional data sets that may be selected for display, according to more exemplary embodiments.
Figure 6:
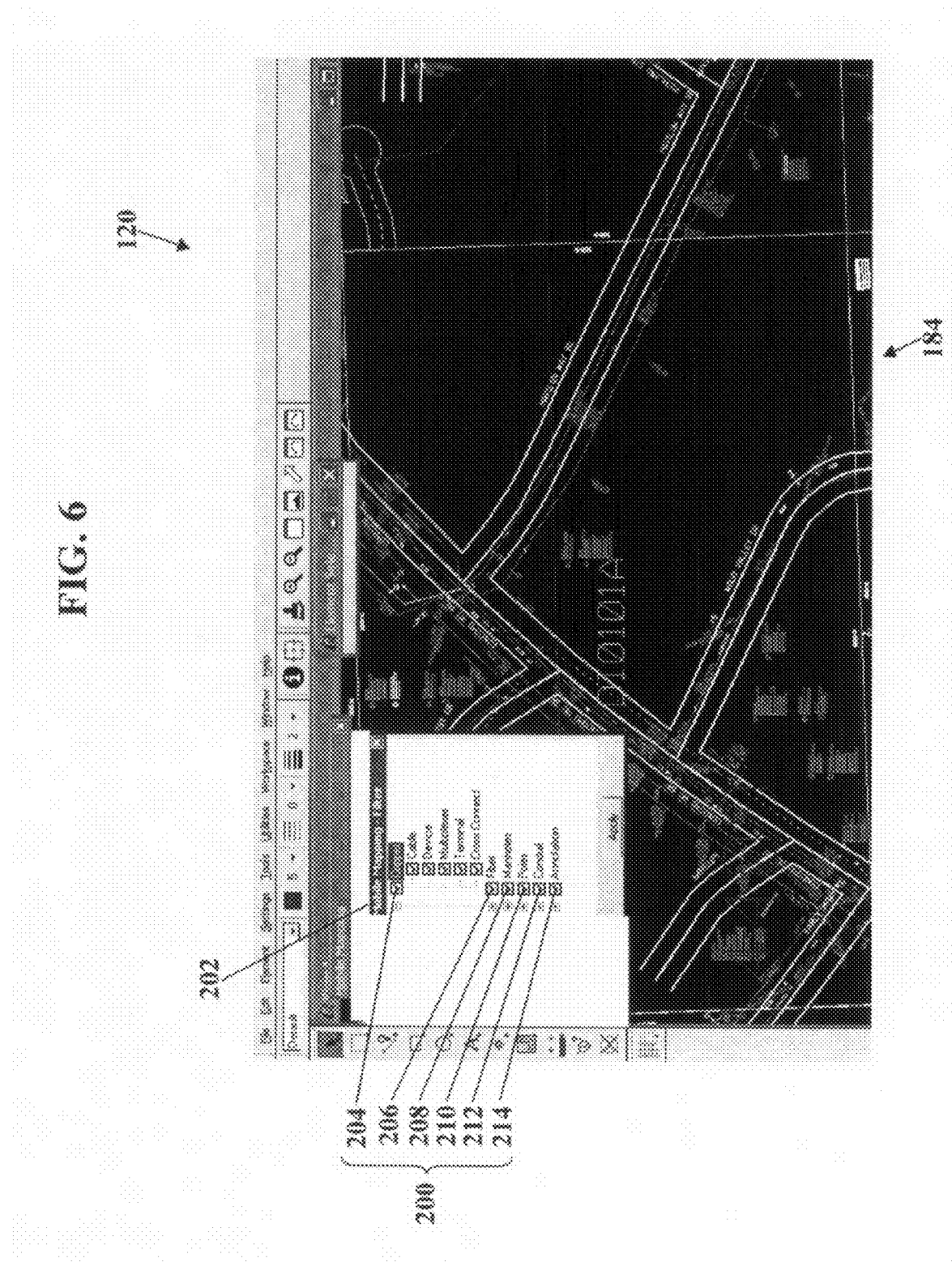
Figure 7:
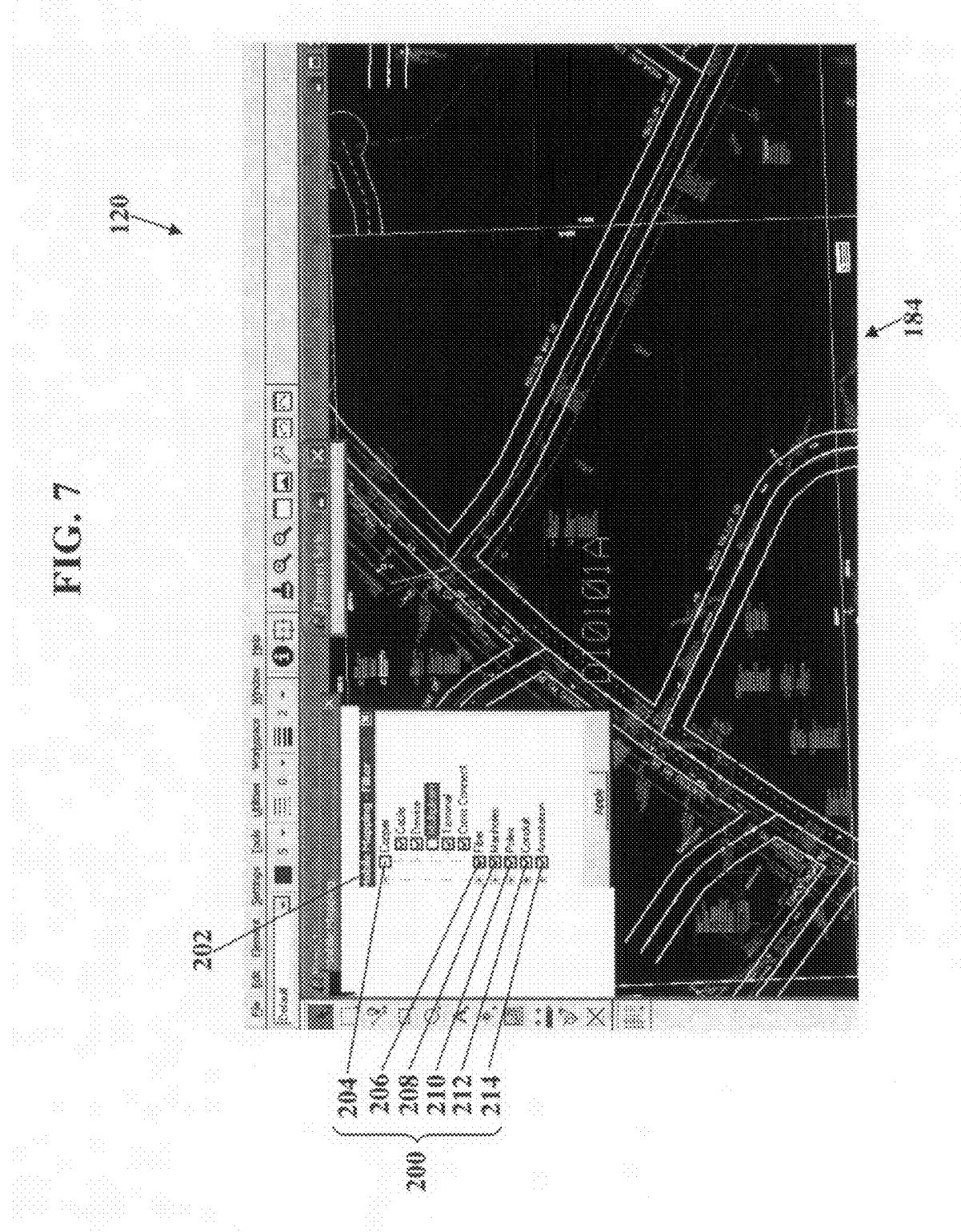

FIGS. 5-7 are more screenshots illustrating additional data sets 200 that may be selected for display, according to more exemplary embodiments. Exemplary embodiments permit selection of data sets at very granular levels. FIGS. 5 and 6, for example, illustrate a filtering dialog box 202. The filtering dialog box 202 offers the capability to "drill down" to even specific types of equipment. That is, the user may select and deselect for display individual equipment and/or components. In the communications industry, for example, the filtering dialog box 202 may present options for selecting/deselecting copper wire equipment data 204, fiber optic equipment data 206, manhole data 208, utility pole data 210, conduit data 212, and even annotation data 214. FIG. 6 illustrates that each equipment option may itself have nested data sets for subcategories of equipment. FIG. 7 illustrates that unwanted equipment may be quickly and easily removed by deselecting the corresponding equipment data set. Whatever data is chosen to show or hide, the server-side mapping application 108 and/or the client-side mapping application 114 cooperate to update or refresh the graphical user interface 120. The selected data may then be overlaid onto the graphical map 184 of roads. The filtering dialog box 202 is very useful for those personnel who are only assigned to a particular type of equipment. In the communications industry, for example, some personnel are dedicated to copper equipment, while others are dedicated to fiber equipment. These dedicated personnel, then, may wish to deselect or hide data that is not relevant to their assignments. Similarly, in other industries, some personnel may be dedicated to hydraulic equipment, while others are dedicated to stamping machinery or to electrical equipment. The ability to hide unwanted data may greatly simplify the graphical user interface 120. Again, then, exemplary embodiments may provide options to show or hide any equipment for any industry.

Figure 8:
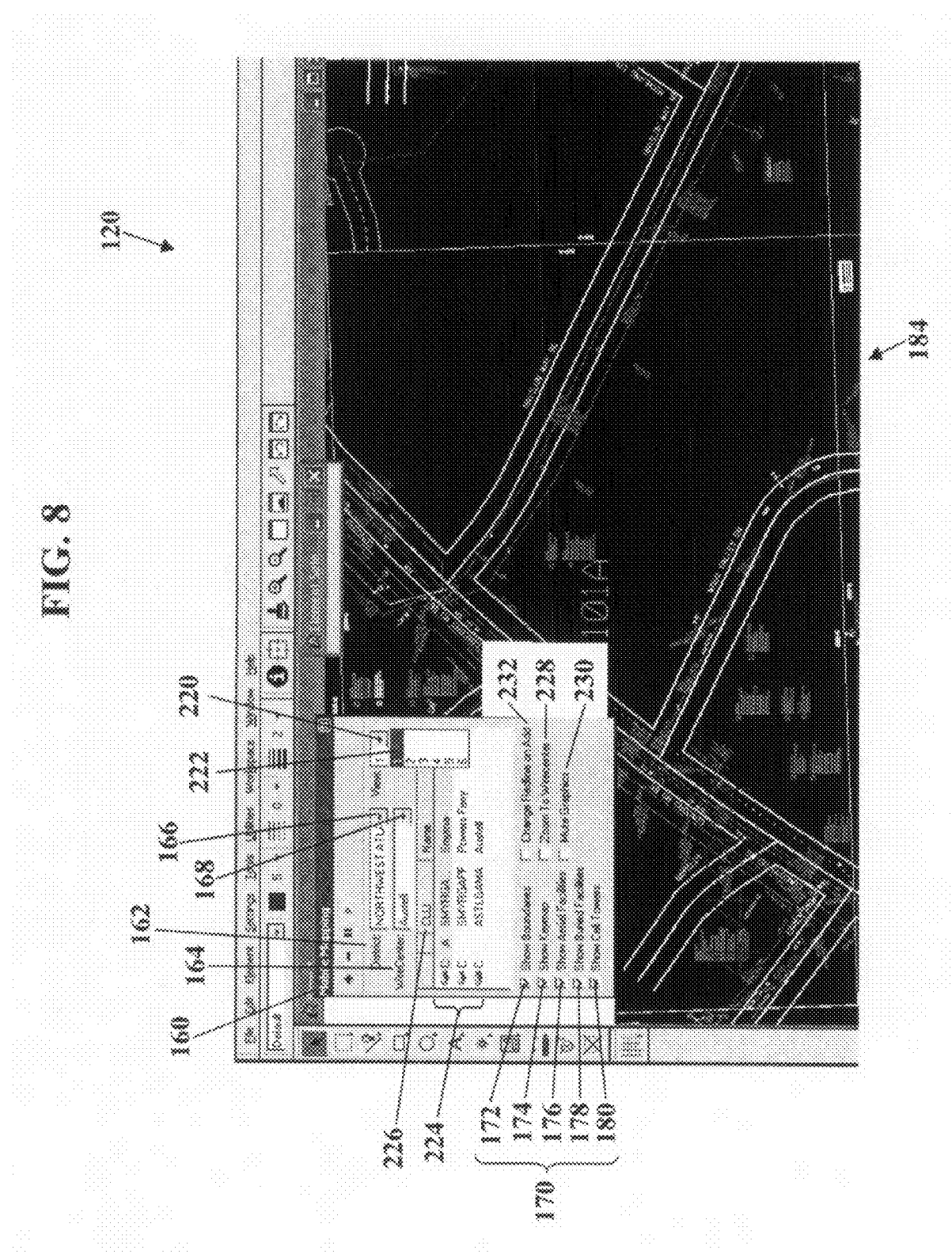
FIG. 8 is another screenshot illustrating additional options and/or data that may be selected for display, according to more exemplary embodiments.

FIG. 8 is another screenshot illustrating additional options and/or data that may be selected for display, according to more exemplary embodiments. Here the dialog box 160 includes a view control 220 that, when selected, produces a drop down menu 222 for selecting different views. Each view (or window) may be configured to display different information. That is, a first view may show copper equipment, while a second view may be created to show only fiber equipment. The drop down menu 222 is illustrated as having six (6) different views, yet exemplary embodiments may be configured for any number of views.

The dialog box 160 may also include options for viewing multiple wire centers. When the user selects the control 168 to select the desired wire center 164, some wire centers may have similar names. In the southeastern United States, for example, there may be many wire centers that are each generically named "airport." Each of these "airport" wire centers, then, must have a more descriptive designation. The dialog box 160, then, may include a listing 224 of wire centers that are each associated with the generic wire center 164. Each wire center in the listing 224 of wire centers may have a corresponding, but unique, identifier 226. FIG. 8, for example, uniquely lists each wire center using a "CLLI" (Common Language Location Identifier) designation 226. Exemplary embodiments, then, permit the user to show, or "turn on," adjacent wire centers to produce a seamless transition between different sets of wire center data. So, even though the wire center data may be segmented, exemplary embodiments permit a quick and simple transition between different wire centers, thus allowing the user to view multiple locations at one time. Exemplary embodiments, then, may cause display of data from any number of different sources and seamlessly merge that data. In the communications industry, data from different wire centers may be presented, without exiting included within the application, without exiting the server-side mapping application 108 and/or the client-side mapping application 114 to switch to another wire center data set. A "Zoom to Wire Center" option 228, for example, allows a user to add a wire center and "zoom" to that wire center data, as opposed to maintaining the current view. A "Mute Graphics" option 230 allows the user to fade graphics into a background color (such as gray).

Exemplary embodiments may also display annotations. FIG. 8 illustrates the dialog box 160 as including a "Change Redline on Add" option 232. This option 232 allows the user to add, or capture, notes or graphics that document or annotate items, facilities, and/or equipment of interest. The user, for example, might annotate a hazardous condition in the vicinity of a utility pole or machine. Whatever the annotation, the annotating data is captured in an annotating file (such as a "red line" file for the associated wire center). When the user changes or switches to a different wire center data set, the user may also switch to a different annotating file.

Figure 9:
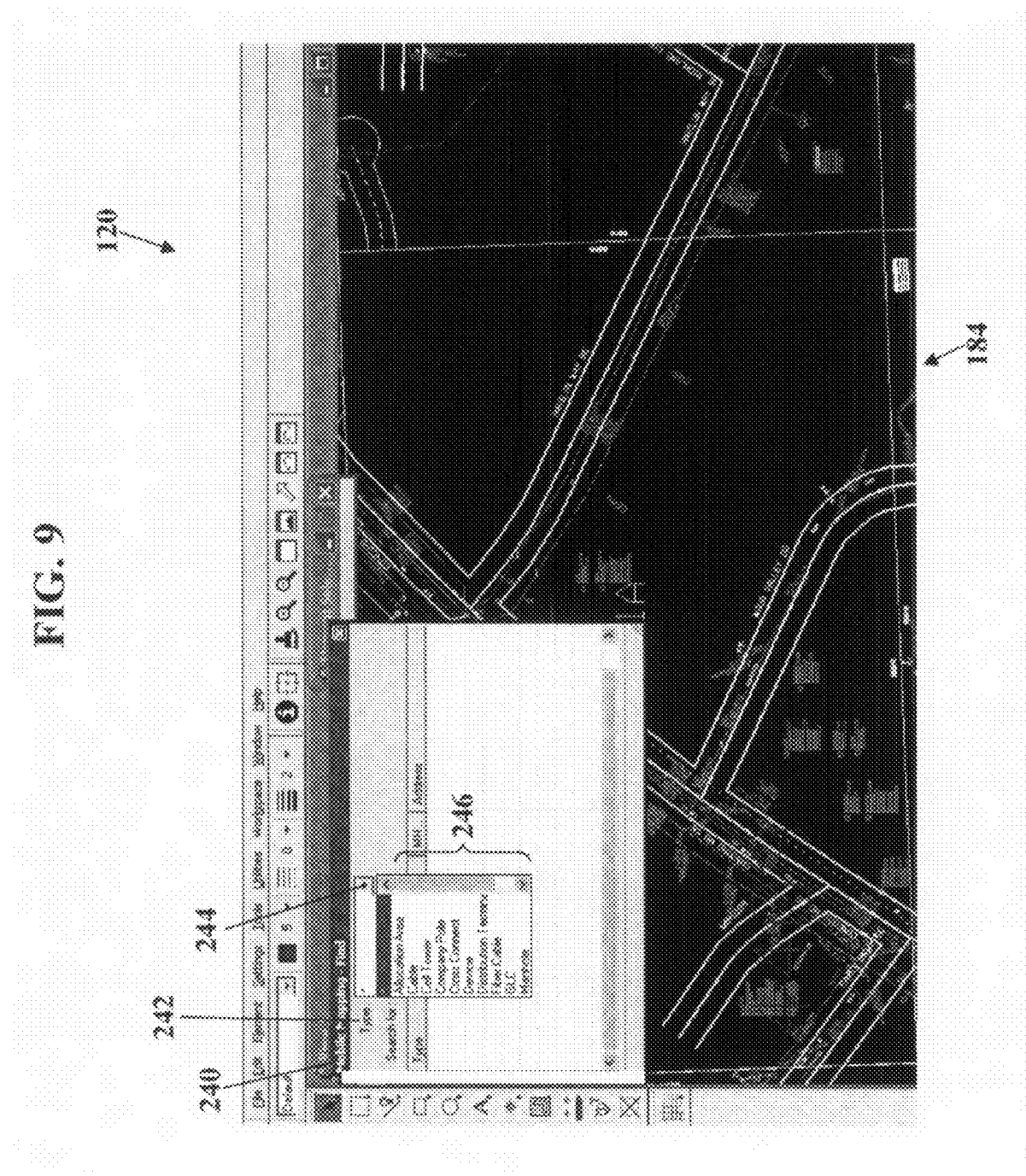
FIGS. 9-11 are additional screenshots illustrating search capabilities, according to more exemplary embodiments.
Figure 10:
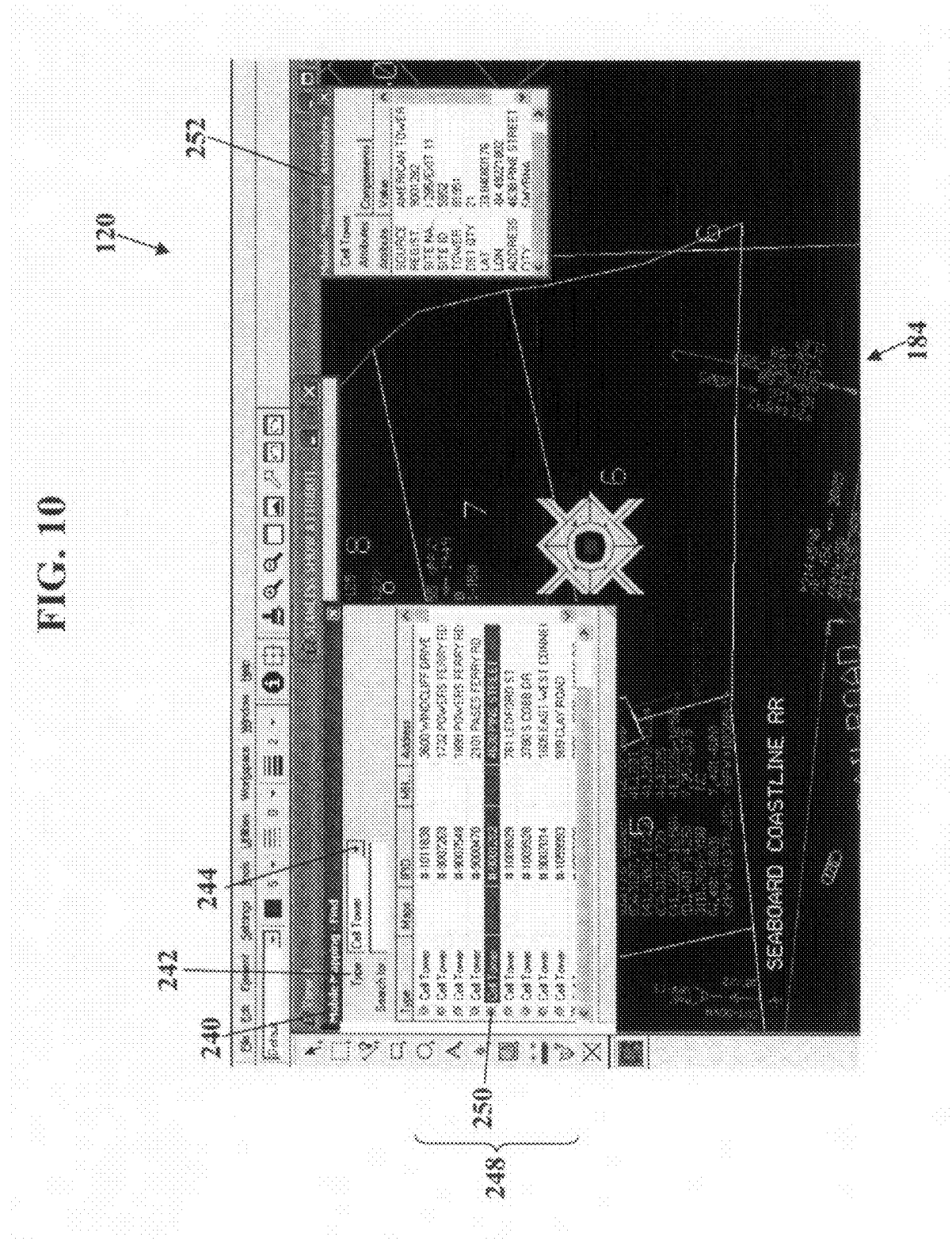
Figure 11:
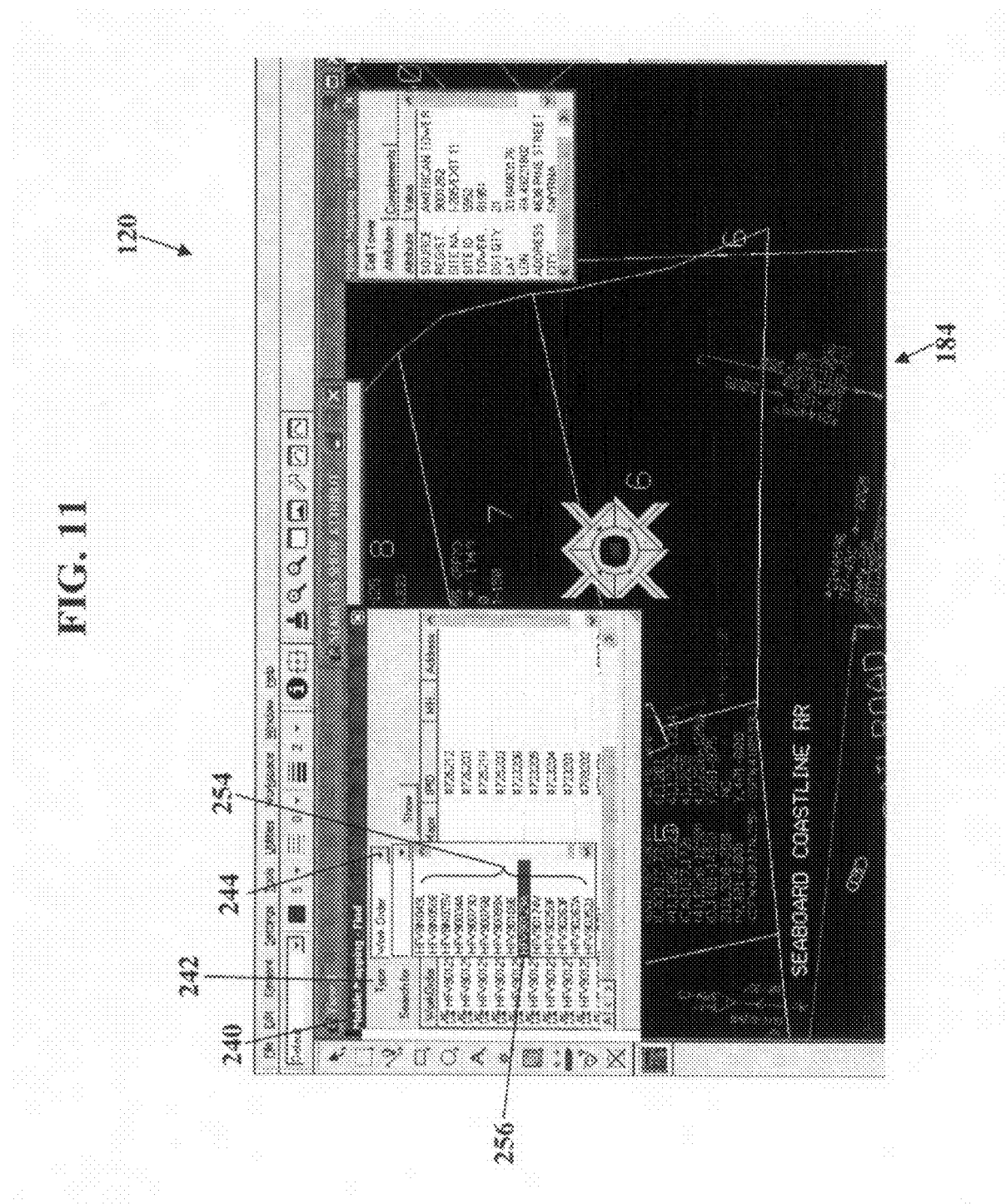

FIGS. 9-11 are additional screenshots illustrating search capabilities, according to more exemplary embodiments. As the above paragraphs explained, the server-side mapping application 108 and/or the client-side mapping application 114 may query the mobile mapping database 118 and/or the additional databases 140 to obtain source data (as FIGS. 1 and 2 illustrate). This source data may be organized into data tables, and each data table may be dedicated to particular equipment, features, or facilities. In the communications industry, for example, data may be organized by cell towers, poles, terminals, and other designations. FIG. 9, then, illustrates a find dialog box 240. This find dialog box 240 allows the user to search the source data. A type field 242, for example, permits the user to input or enter a search term. Or, when a control 244 is selected, a drop down menu 246 of search terms is produced. Because exemplary embodiments are tailored for the communications industry, the drop down menu 246 presents a list of communications facilities and/or equipment. The user may select a desired facility, or the user may select a Boolean wild card (e.g., the "*" character) for all facilities. The server-side mapping application 108 and/or the client-side mapping application 114 may then query the source data and retrieve the search results.

FIG. 10, for example, illustrates search results for cell towers. Here the user selected "cell tower" in the type field 242. Exemplary embodiments then query the source databases (e.g., the mobile mapping database 118 and/or the additional databases 140) for cell tower data. The find dialog box 240 then visually or graphically produces an overlay of this cell tower data. The find dialog box 240, for example, produces a listing 248 of cell towers. Should the user select a particular entry 250 in the listing 248 of cell towers, exemplary embodiments may center the displayed view about that equipment item. Exemplary embodiments may also "zoom in" on that item. FIG. 10, for example, illustrates the graphical user interface 120 having a magnified or scaled view that is centered about the selected cell tower (e.g., entry 250). This scaled view also makes any accompanying text legible. Exemplary embodiments may even delete some text or notes when a font size is too small to be legible (as when the user has "zoomed out" or set a small scale). An attributes dialog box 252 may be visually produced and integrated with the listing 248 of cell towers. As the user scrolls from one cell tower entry to another entry in the listing 248 of cell towers, the attributes dialog box 252 concurrently displays attributes associated with each entry. The attributes dialog box 252 reveals any information associated with the selected entry, even if some information is not displayable.

FIG. 11 illustrates more search capabilities. Here the type field 242 may also permit searching the source data by work order. When the control 244 is selected, the drop down menu 246 of search terms (illustrated in FIG. 9) may include an option to search the source data by work order. Exemplary embodiments, then, query the source databases (e.g., the mobile mapping database 118 and/or the additional databases 140) for work order data. The find dialog box 240 may then display a listing 254 of work order numbers (or job numbers). When the user selects a particular entry 256 in the listing 254 of work order numbers, exemplary embodiments query and retrieve information associated with the work order (such as a history, status, and/or update of that particular work order). Whatever the industry, exemplary embodiments permit searching and displaying any source data.

Figure 12:
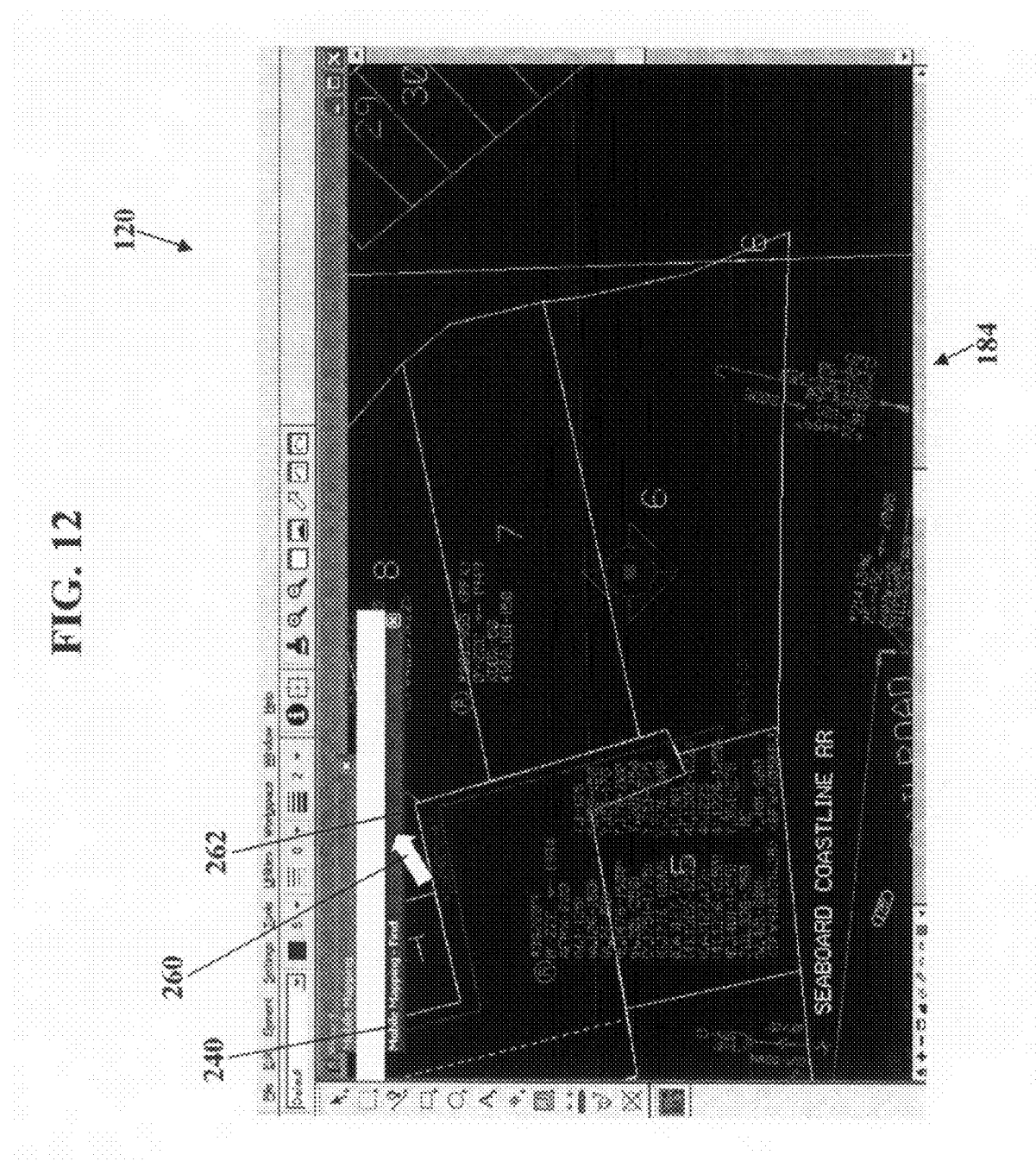
FIG. 12 is another screenshot that illustrates screen management features, according to more exemplary embodiments.

FIG. 12 is another screenshot that illustrates screen management features, according to more exemplary embodiments. Here, as the user creates different views and searches for data, any dialog box may become too large to be effectively presented on the display device 122 (illustrated in FIG. 1). Field personnel, for example, may have laptops, PDAs, or phones with small displays. Some dialog boxes may become comparatively large, so management of a screen's real estate may be important. Exemplary embodiments, then, may include a single feature that quickly and easily minimizes or maximizes any dialog box or window. Should the user place a cursor 260 on a title bar 262 and click or "double-click," for example, the corresponding find dialog box 240 may be minimized. Another input in the same title bar 262 may toggle the find dialog box 240 to a maximized view. The title bar 262, however, remains displayed in its original location, before minimization. That is, the title bar 262 remains in a static, stationary position and does not move to another bar or another location (e.g., different pixel coordinates) in the screen (e.g., the task bar in WINDOWS®). These selections may be performed using any means of selection, whether tactile (e.g., "mouse," pen, touch screen), visual, or even automatic. This selecting and de-selecting a title bar is a quick and simple means for toggling dialog boxes.

Figure 13:
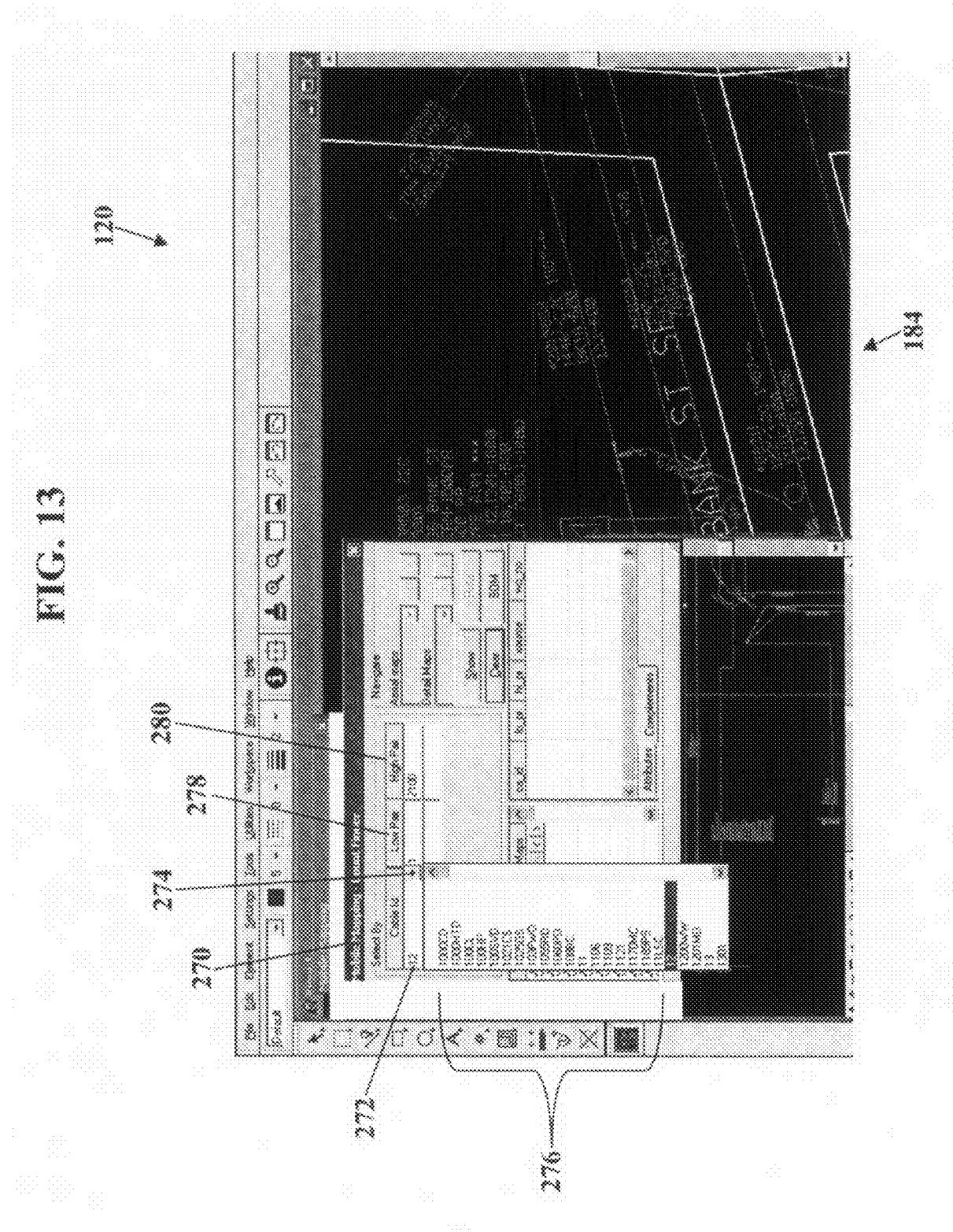
FIG. 13 is a screenshot illustrating additional search capabilities, according to more exemplary embodiments.

FIG. 13 is a screenshot illustrating additional search capabilities, according to more exemplary embodiments. In the communications industry, exemplary embodiments may permit the user to search for cable counts. FIG. 13, then, illustrates a count finder dialog box 270. This count finder dialog box 270 allows the user to search for cable counts. A cable ID field 272, for example, permits the user to input or enter a name or identifier of a desired cable. Or, when a control 274 is selected, a drop down menu 276 of cable identifiers is produced. When the user selects a cable name, exemplary embodiments then search the source databases (e.g., the mobile mapping database 118 and/or the additional databases 140) for the desired cable name. Exemplary embodiments may then retrieve a corresponding a minimum low pair 278 and a maximum high pair 280. The user can edit these low pair 278 and/or high pair values 280 to more specifically define the cable count of interest. This search feature is especially useful in finding candidate cables and may shave hours from determining faulty cables.

Figure 14:
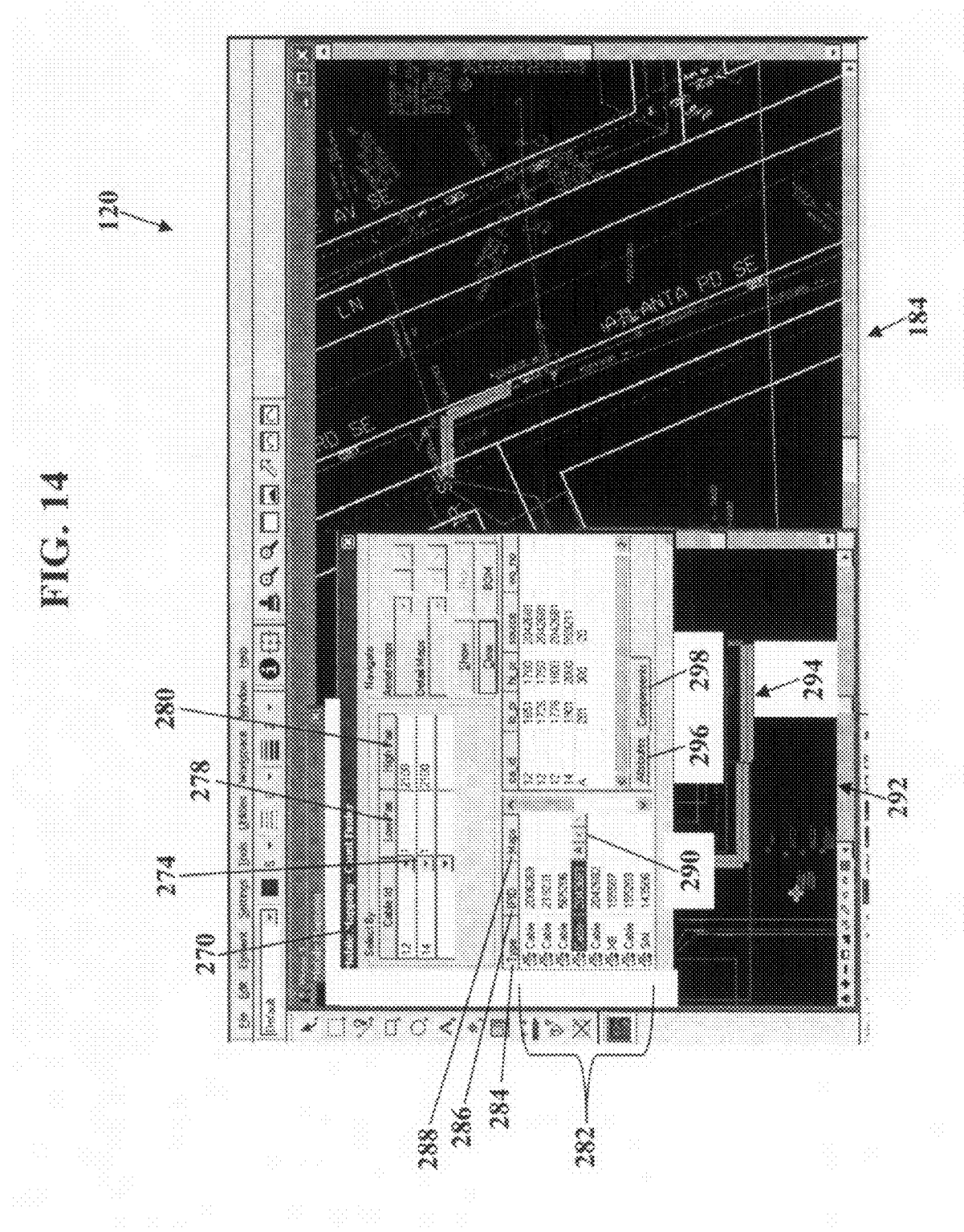
Figure 15:
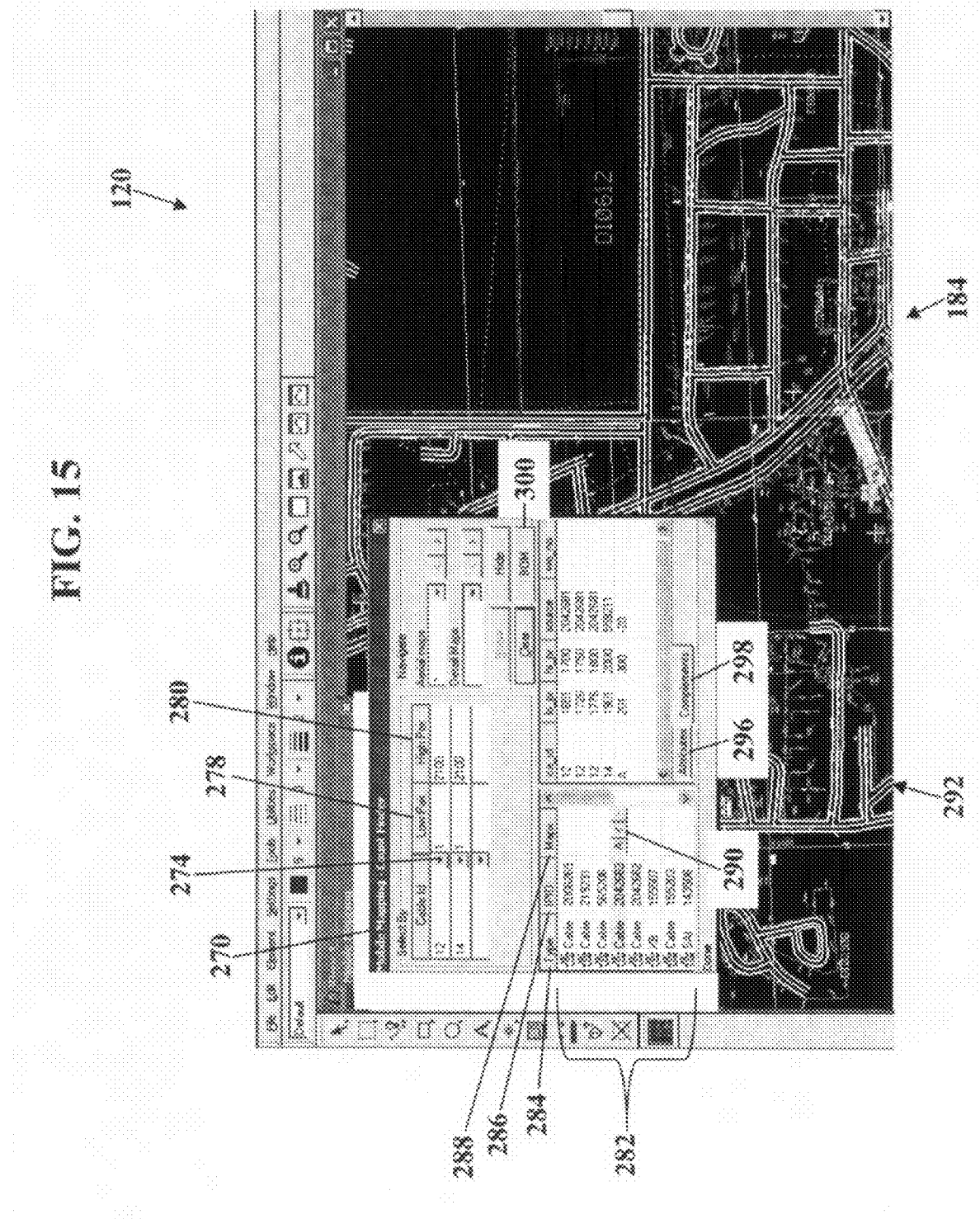

FIGS. 14-17 are still more screen shots illustrating additional search features, according to exemplary embodiments. Here exemplary embodiments permit the user to query for and retrieve cable counts and ranges. The count finder dialog box 270 allows the user to enter multiple count ranges and to find target candidates where all of the different cable counts appear. When target candidates are found, the count finder dialog box 270 displays a listing 282 of cable candidate identifiers. Each entry in the listing 282 of cable candidate identifiers may include information that further identifies the candidate cable. FIG. 14, for example, illustrates a "Type" column 284 and an "IPID" (Internet Protocol Identification number) column 286. These columns provide known communications industry information describing each candidate cable and need not be further discussed. A "Maps" column 288, however, indicates on what map, or plat, that the corresponding cable appears. Cable "2042683," for example, is associated with an "A" in the Maps column 288. This "A" designation means cable "2042683" appears on an aerial plat. Scrolling control 290 permits the user to quickly scroll through detail plats or maps. (Conventional tools are cumbersome with no method or mechanism to quickly navigate from plat to plat.) Exemplary embodiments may also cause display of an underground plat 292 that shows the candidate cable (e.g., "2042683"). When the user selects or highlights an entry (such as cable "2042683") in the listing 282 of cable candidate identifiers, the graphical user interface 120 highlights or emphasizes the selected candidate (the candidate cable is illustrated as reference numeral 294). The count finder dialog box 270 provides cables counts for each item or entry in the listing 282 of cable candidate identifiers. An "Attributes" tab 296 or a "Complements" tab 298 may be selected to provide the corresponding information for each item or entry in the listing 282 of cable candidate identifiers. FIG. 15 illustrates that by selecting (such as double-clicking) any candidate in the listing 282 of cable candidate identifiers, the graphical user interface 120 may "zoom" or magnify that feature for a close-up view.

Figure 16:
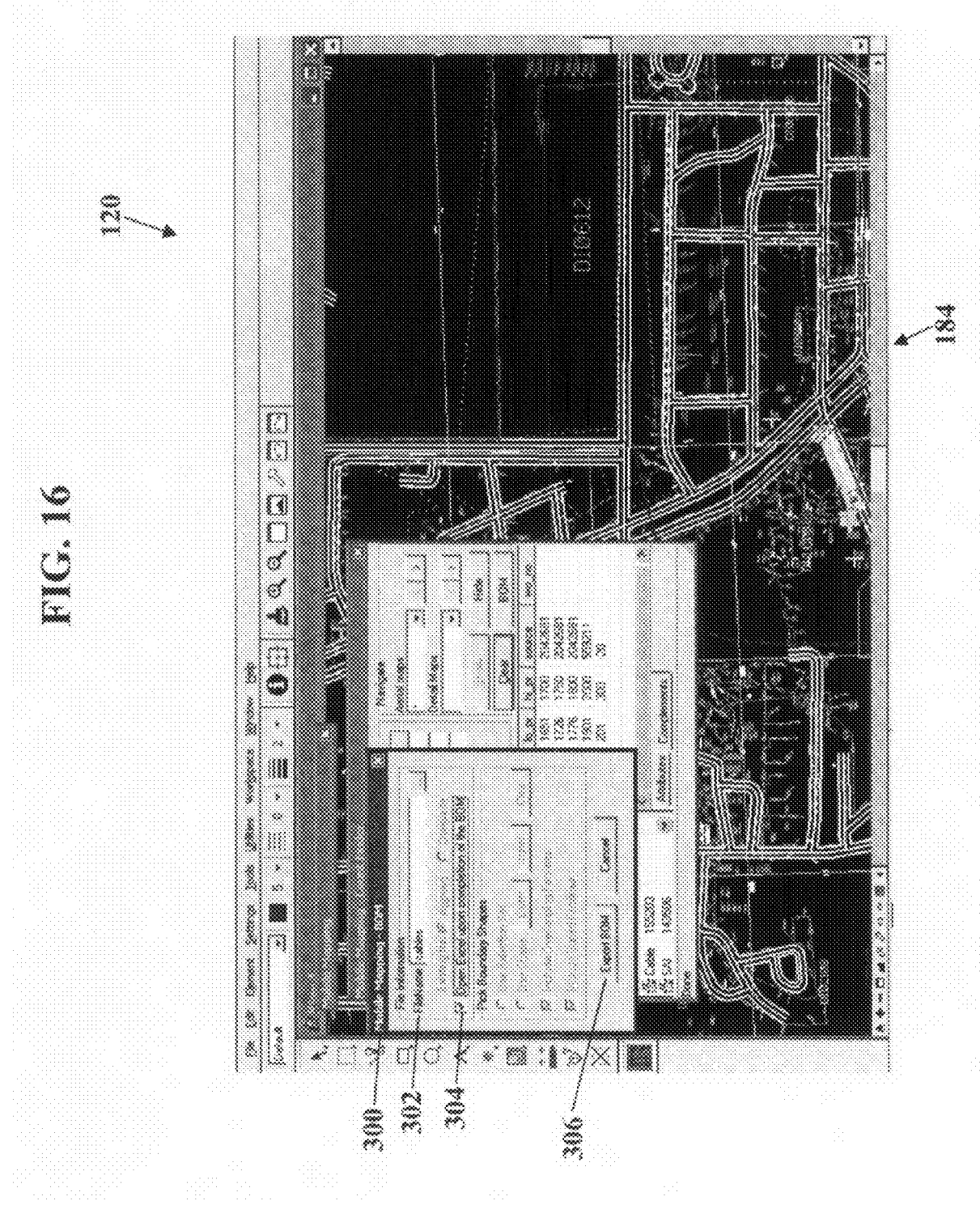
Figure 17:
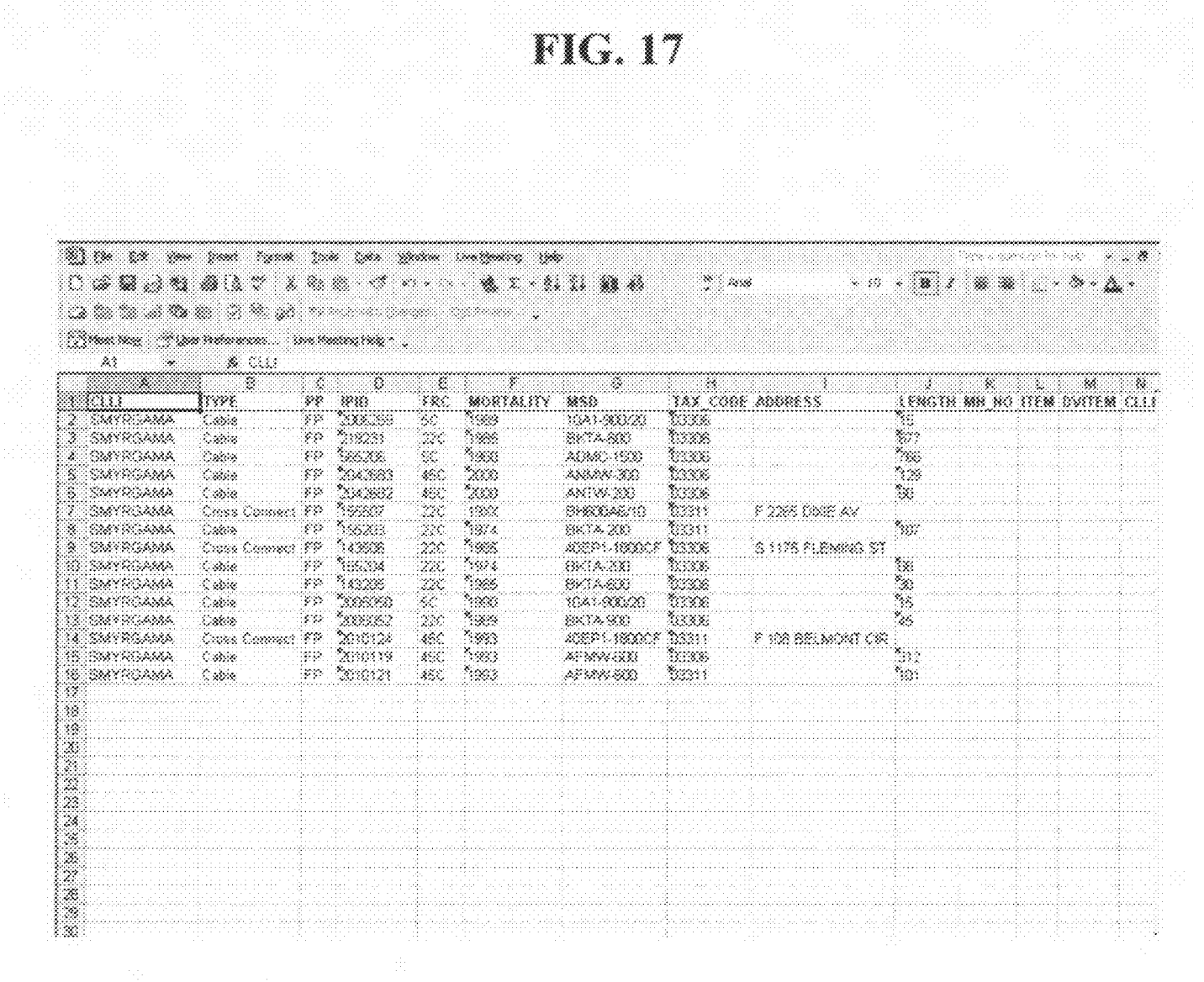

Exemplary embodiments may also provide facilities listings. When the user highlights or otherwise emphasizes an entry (such as cable "2042683") in the listing 282 of cable candidate identifiers, the user may select a "BOM" (or "Bill of Materials") control button 300. This feature produces a list of all facilities containing or comprising that candidate cable (e.g., "2042683"). FIG. 16, then, illustrates a BOM dialog box 300. This BOM dialog box 300 prompts the user to enter a filename 302. When the bill of materials is completed, the user also has an option 304 to open the MICROSOFT® EXCEL® software application and to display the bill of materials as a spreadsheet. The user then selects an Export BOM control button 306 to generate the bill of materials. FIG. 17 then illustrates a MICROSOFT® EXCEL® spreadsheet file that lists the bill of materials. The bill of materials is a list of attributes associated with the candidate cable (e.g., "2042683").

Figure 18:
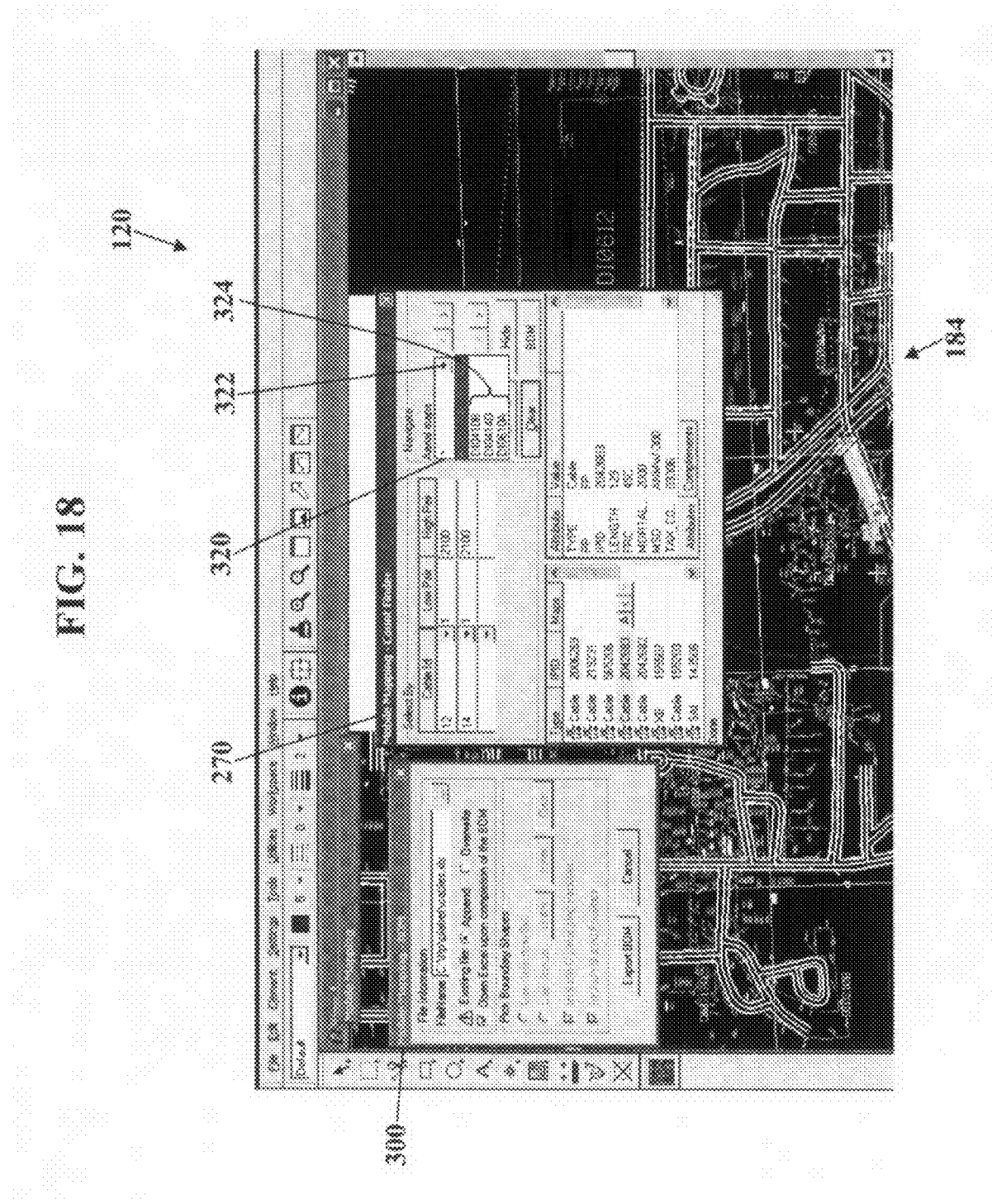
FIGS. 18 and 19 are screenshots illustrating additional navigation features, according to exemplary embodiments.
Figure 19:
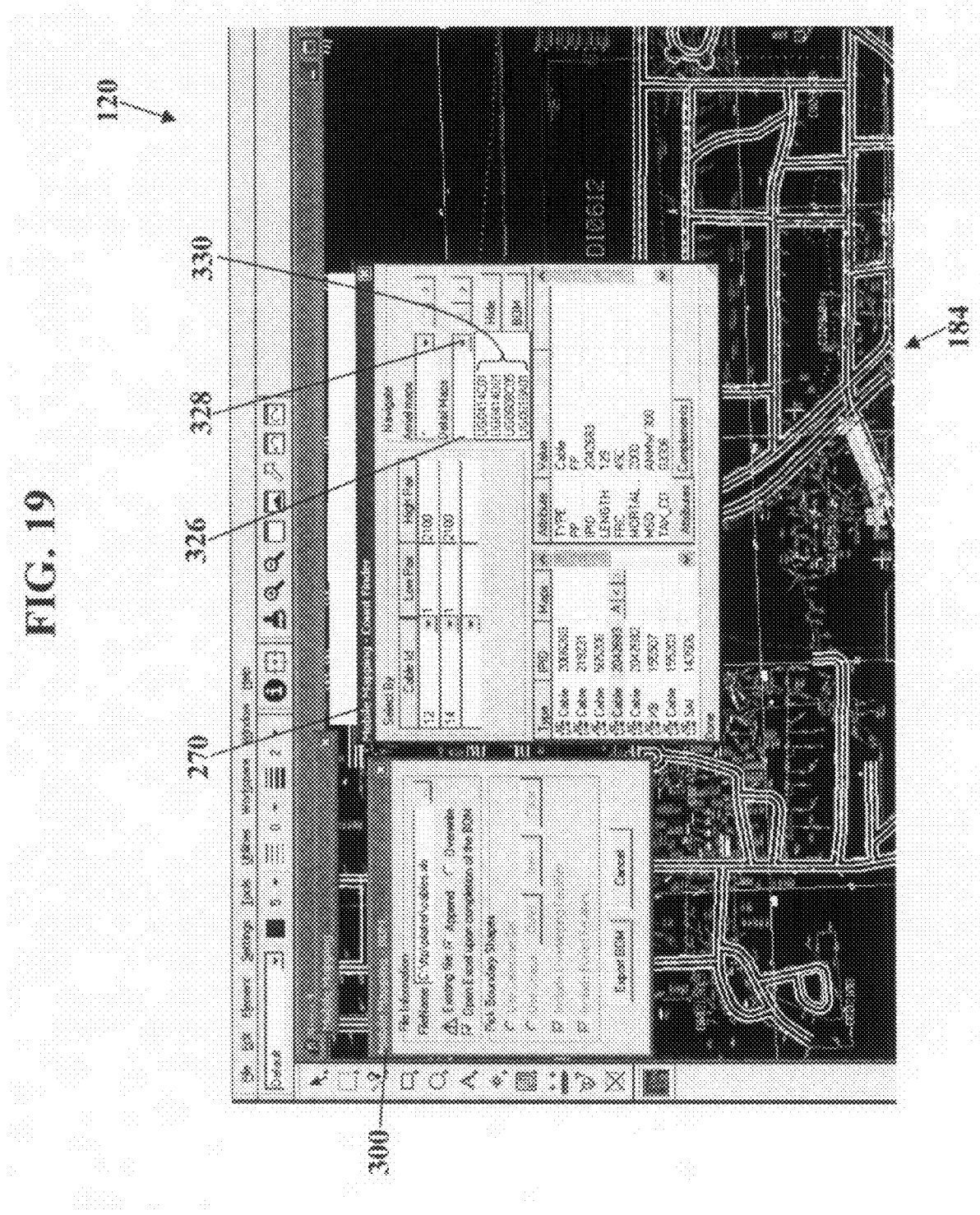

FIGS. 18 and 19 are screenshots illustrating additional navigation features, according to exemplary embodiments. FIG. 18 illustrates an option to navigate aerial maps. An aerial map field 320, for example, permits the user to input or enter a name or identifier of an aerial map. An aerial control 322 may be selected to display a drop down menu 324 of aerial maps. FIG. 19 similarly illustrates a detail map field 326 for selecting a name or identifier of a detail map. If a map control 328 is selected, a drop down menu 330 of details maps is produced. The "*" character may be used as a Boolean wild card for all selections. These features allow the user to quickly navigate through all the maps that contain information associated with the candidate cable (e.g., "2042683").

Figure 20:
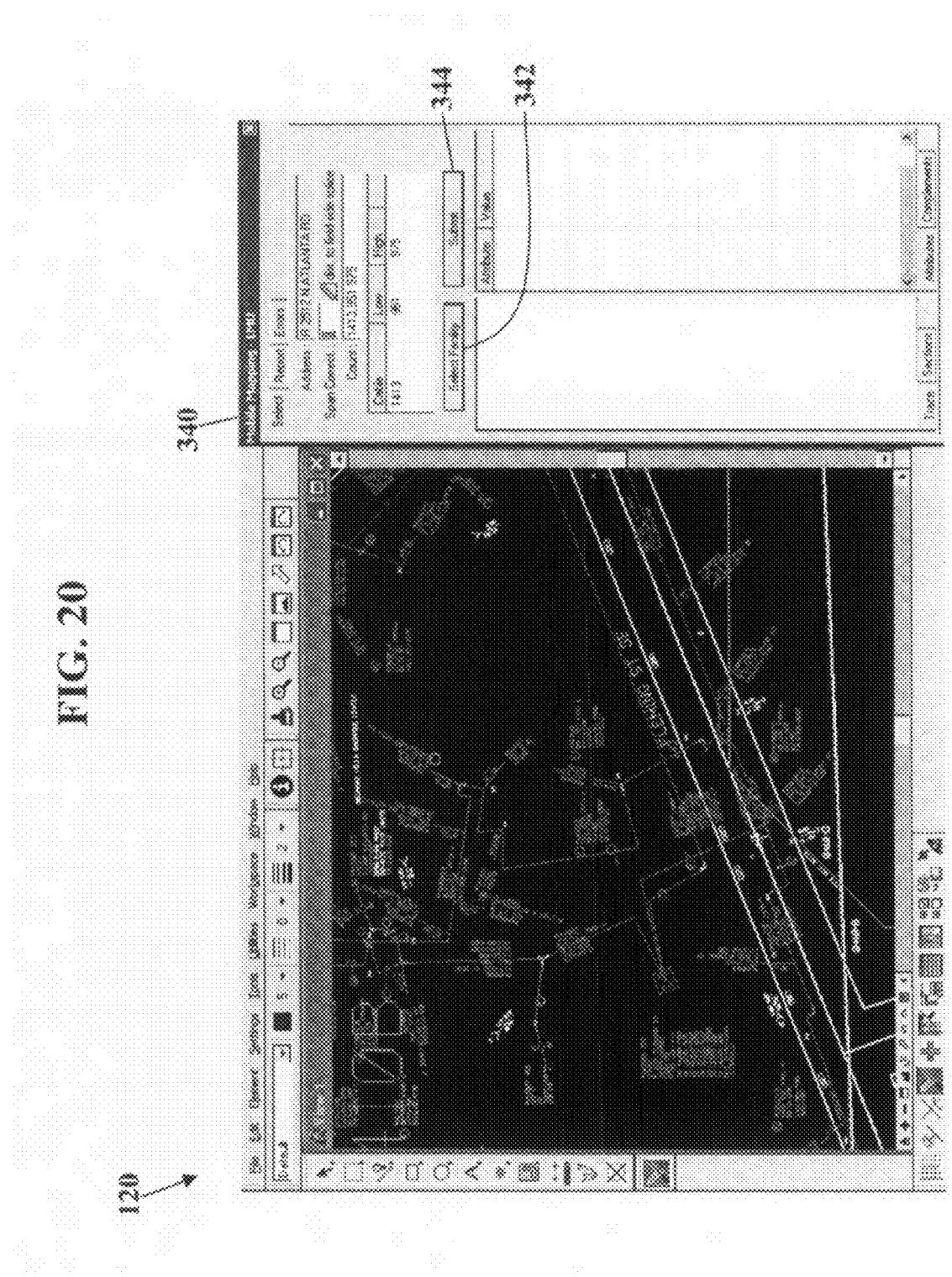
Figure 21:
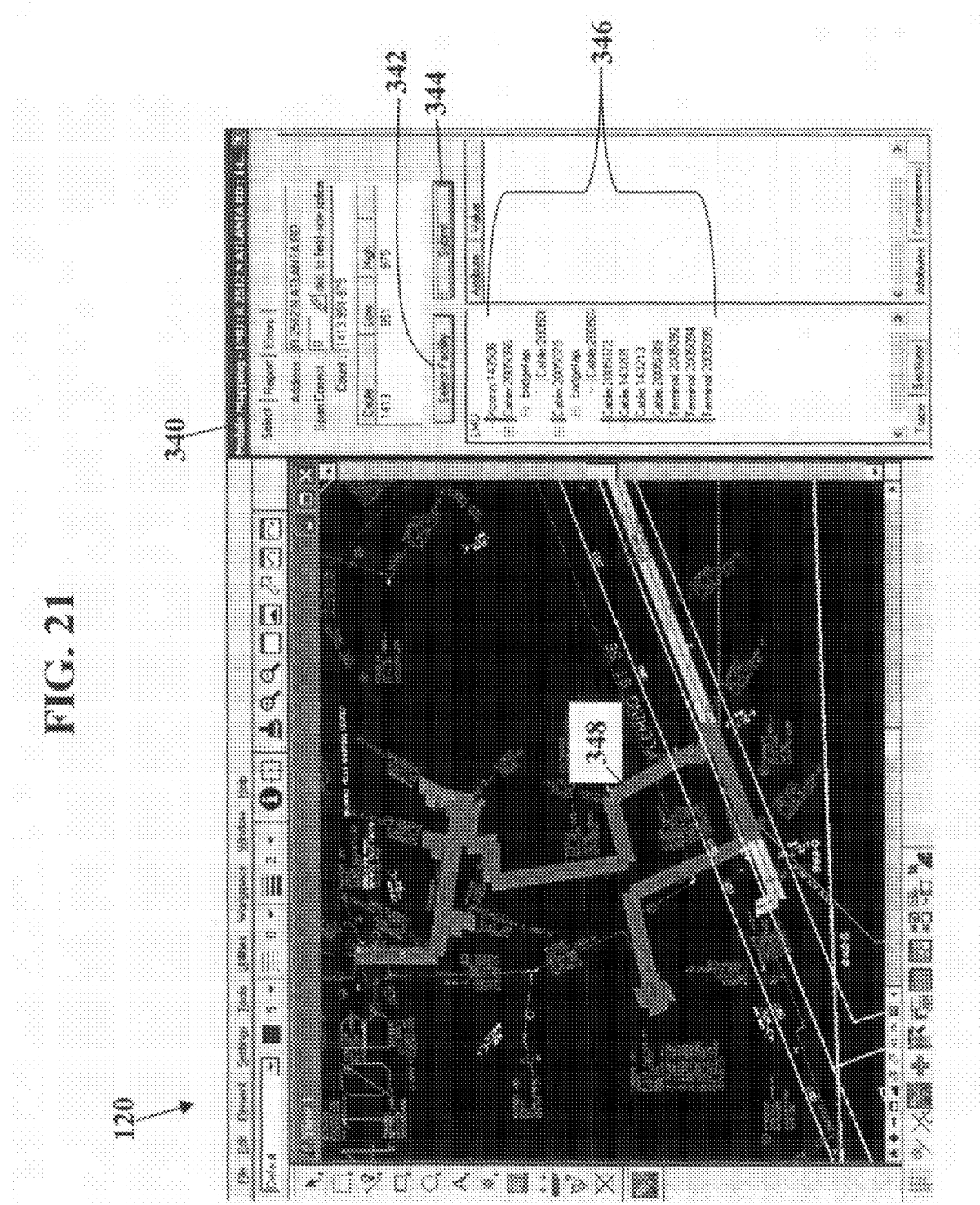
Figure 22:
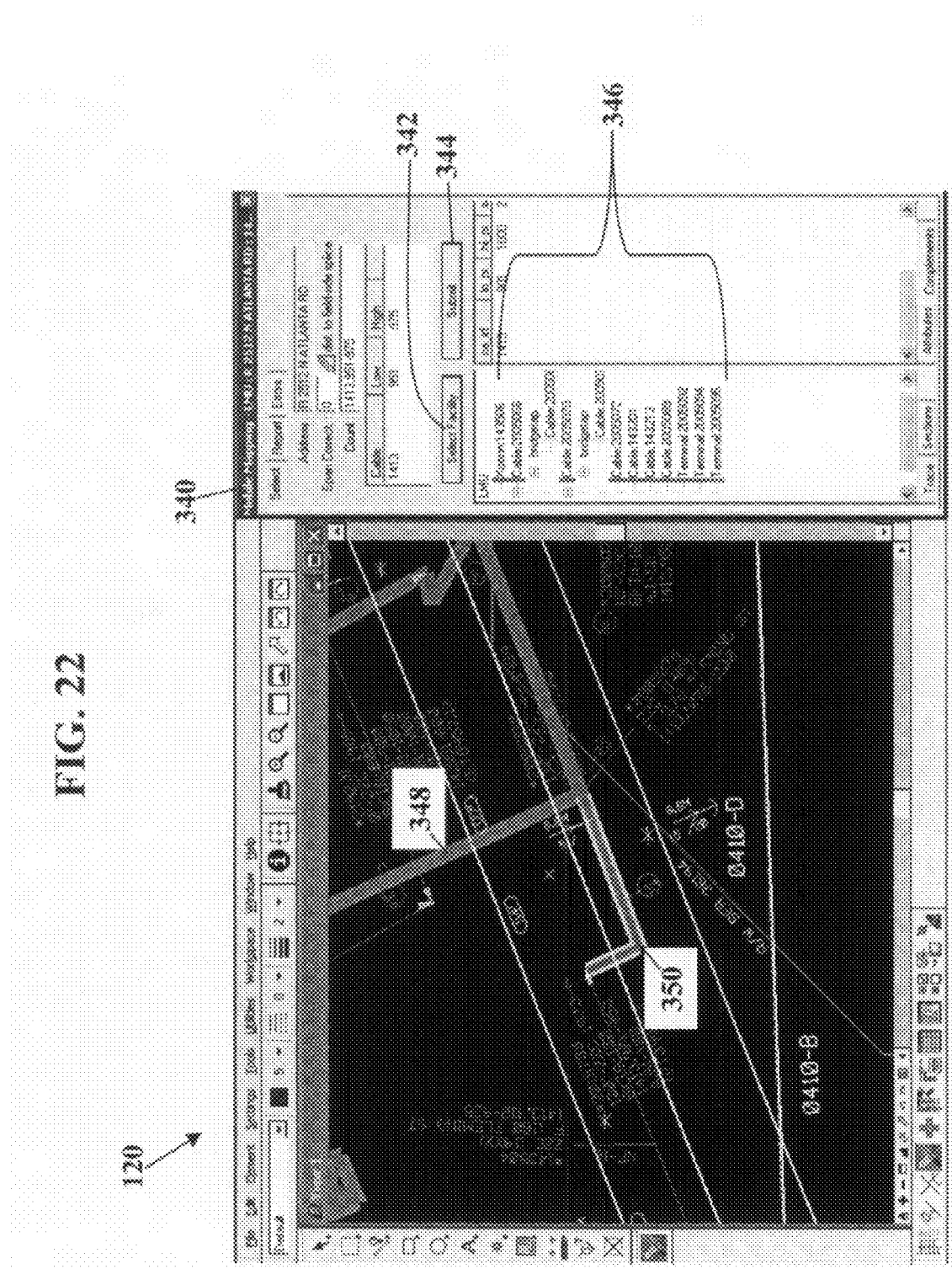

FIGS. 20-24 are screenshots illustrating loop make-up features, according to exemplary embodiments. Exemplary embodiments permit the user to query the source databases for loop make-up (or "LMU") information, even when disconnected from the communications network 104 (illustrated in FIG. 1). That is, the wire center data may be locally stored in the user device 100 (illustrated in FIG. 1) and, thus, accessed without a network connection. FIG. 20 illustrates an LMU dialog box 340. The user starts the loop make-up process by first pointing to, selecting, or otherwise highlighting an item of interest in the graphical user interface 120. The user then selects a "Select Facility" control button 342 and then selects a "Submit" control button 344 in the LMU dialog box 340. Exemplary embodiments then generate a loop make-up for the selected facility. FIG. 21 then illustrates a listing 346 of the loop make-up for the selected facility. The path 348 of the cable count is graphically presented (e.g., cable 1413 with counts 951-975), through multiple items. The path 348 may be emphasized (such as color coded or highlighted) for ease of reference. Color coding may additionally or alternatively designate one or more criteria of each item. For example, a requesting item may be highlighted in blue coloring, the main loop may be shown in green coloring, a bridge tap may have yellow coloring, and an end-section may have purple coloring. FIG. 22 illustrates that selecting or otherwise clicking on any candidate in the listing 346 of the loop make-up causes the graphical user interface 120 to zoom in or magnify to that item. The selected item may again be uniquely highlighted (illustrated by reference numeral 350) or color coded for ease of reference.

Figure 23:
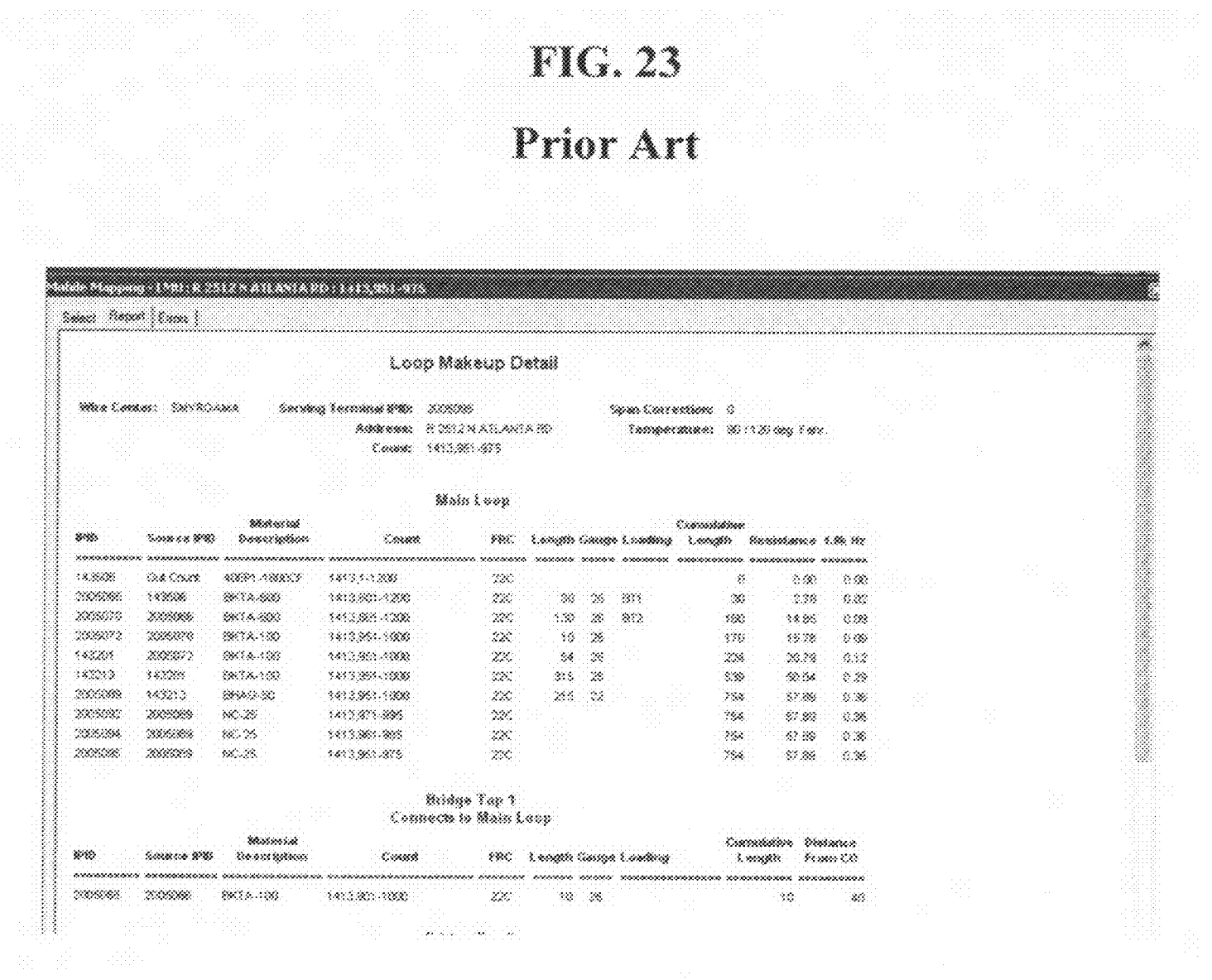
Figure 24:
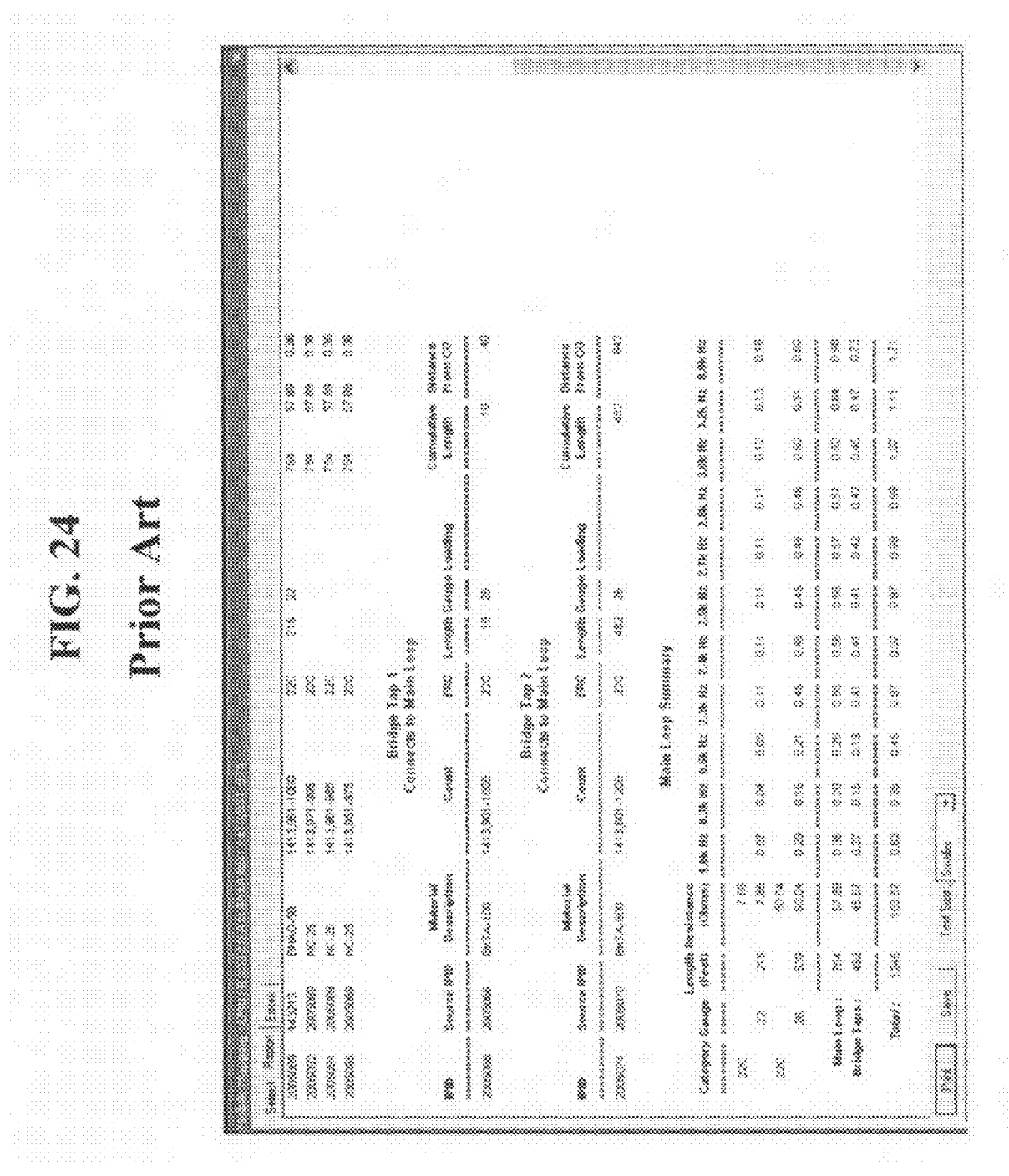

The graphical paths 348 and 350 are much easier to use and visualize than conventional reporting methods. Today, conventional loop make up reports are presented as columnar listings of facilities. FIGS. 23 and 24, for example, are screen shots illustrating prior art loop make-up reports. These prior art, conventional loop make up reports list the items that are connected to one another. These loop make-up reports help predict the capacity of that item to support certain services. Loop make-up reports may also be used to help locate network problems. As the reader may realize, the color-coded, graphical paths 348 and 350 (illustrated in FIGS. 21 and 22) are much easier to use than conventional reporting methods.

Figure 25:
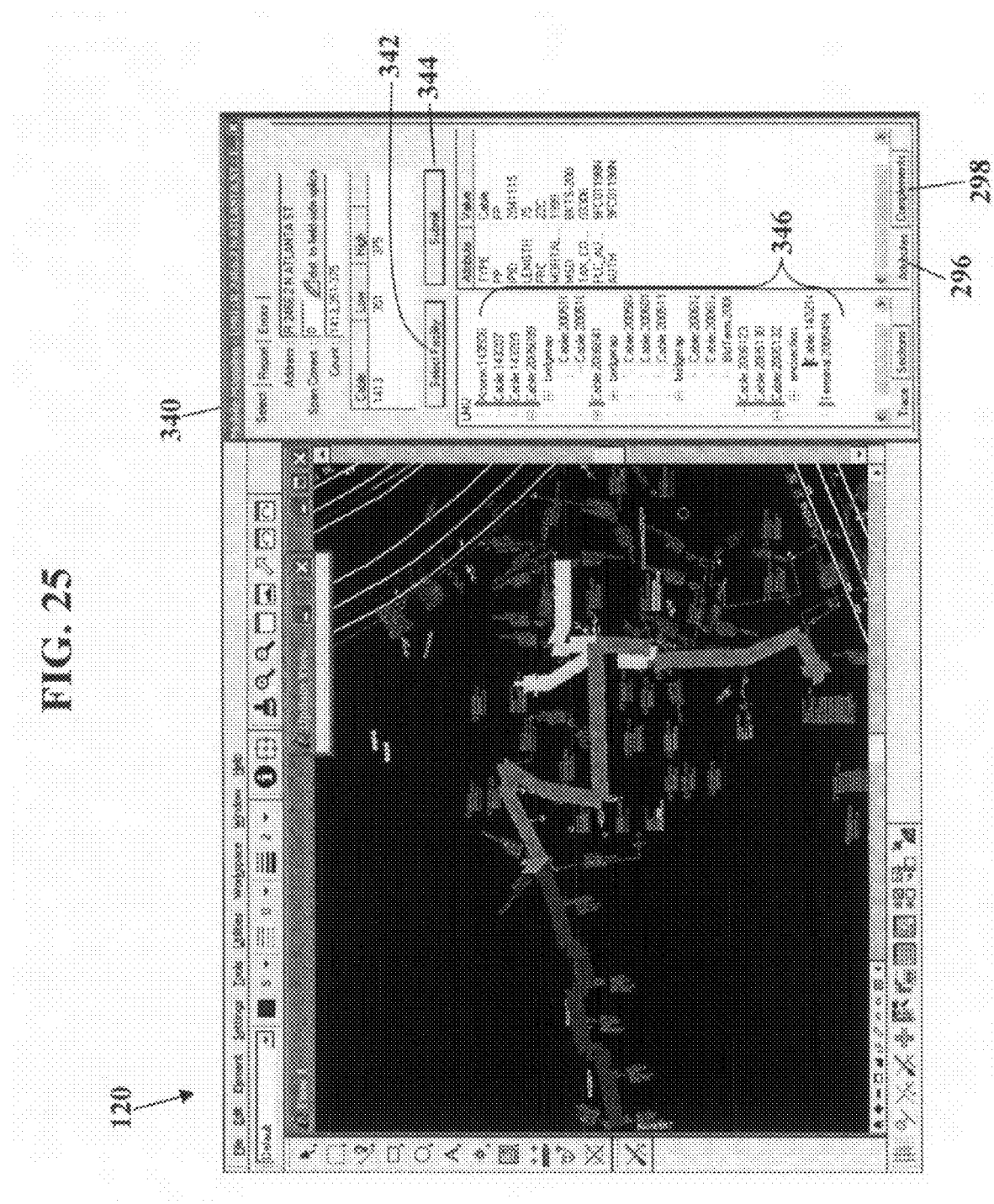
FIGS. 25 and 26 are screenshots illustrating additional features, according to exemplary embodiments.
Figure 26:
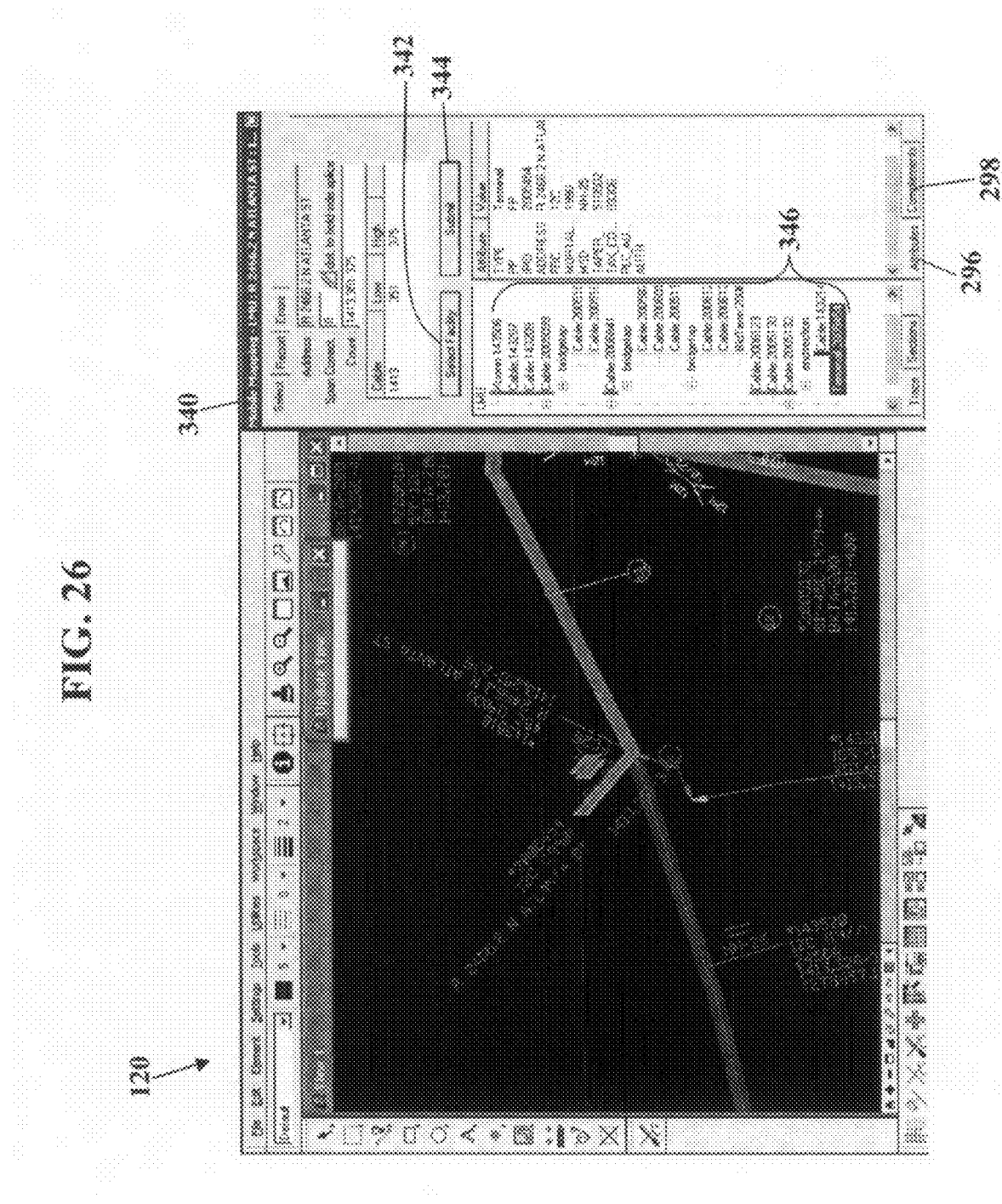

FIGS. 25 and 26 are screenshots illustrating additional features, according to exemplary embodiments. FIG. 25 illustrates an overview of the entire network loop for the count specified. Should the user select or click any item in the listing 346 of the loop make-up, then exemplary embodiments produce the screen shot illustrated in FIG. 26. Here exemplary embodiments cause the graphical user interface 120 to zoom in or magnify onto the selected item. Secondary color coding may be used to further highlight or emphasize the selected item. The Attributes tab 296 or the Complements tab 298 may be selected to provide further information associated with the selected item.

Figure 27:
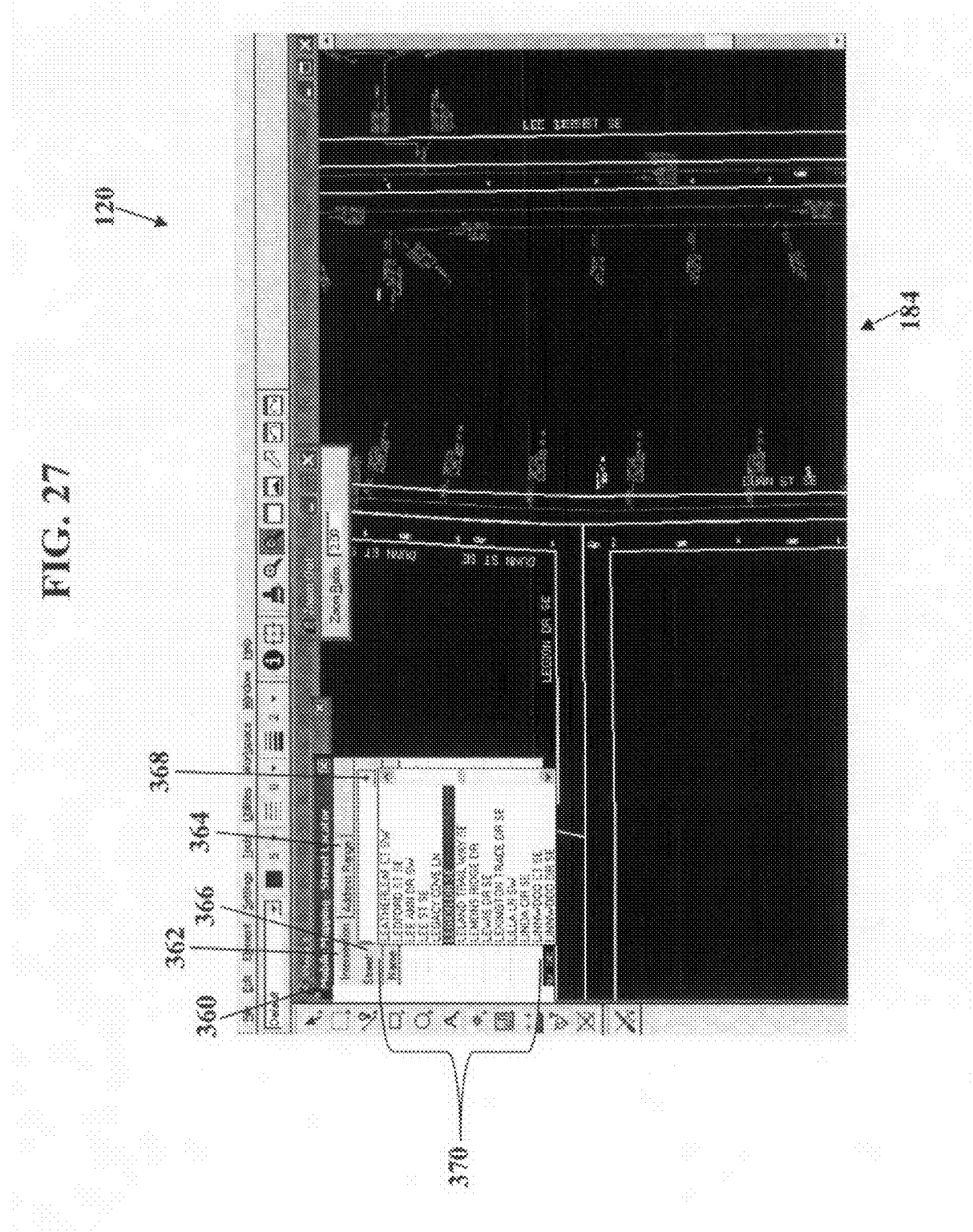
FIGS. 27-29 are screenshots illustrating a capability to search intersections, according to more exemplary embodiments.
Figure 28:
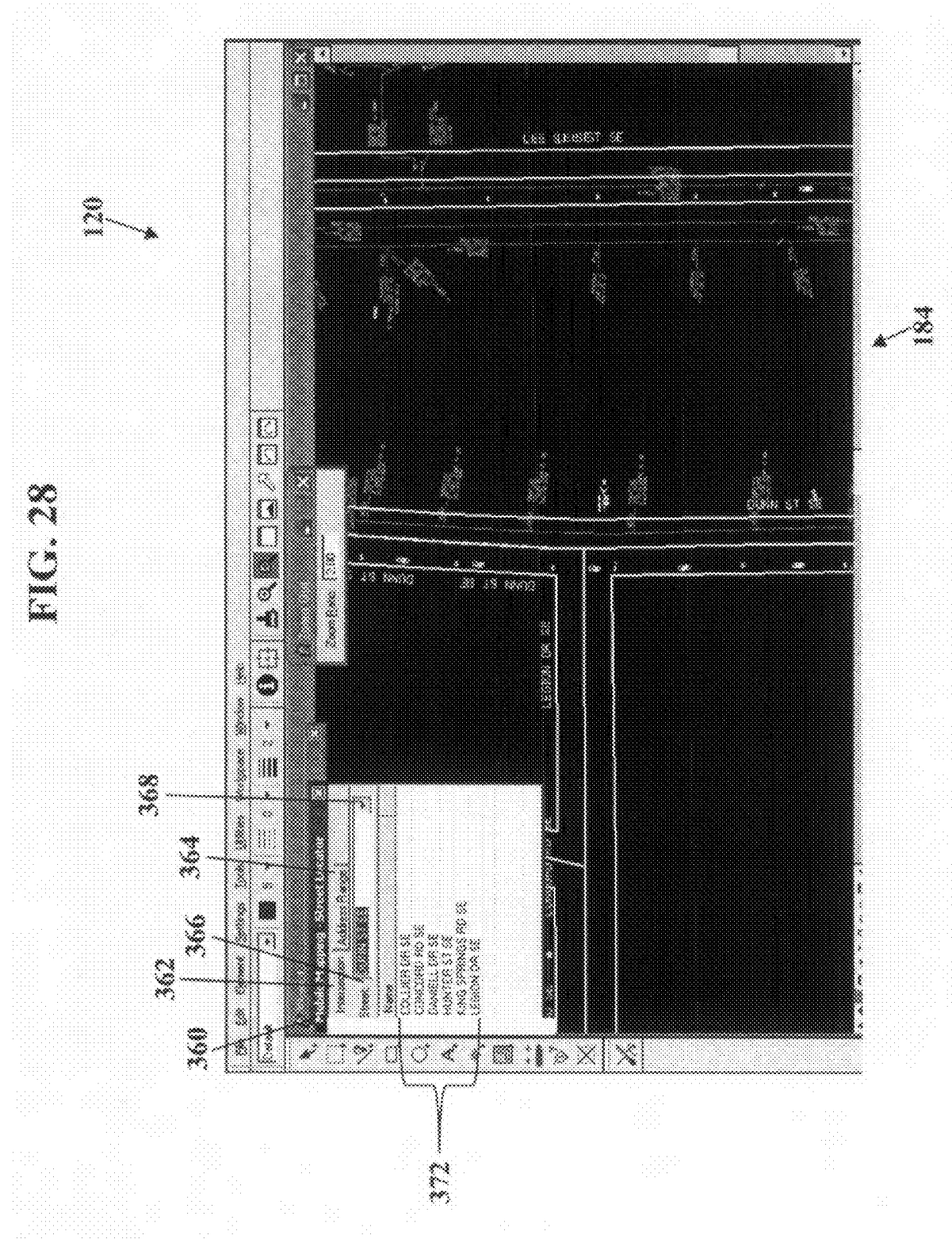
Figure 29:
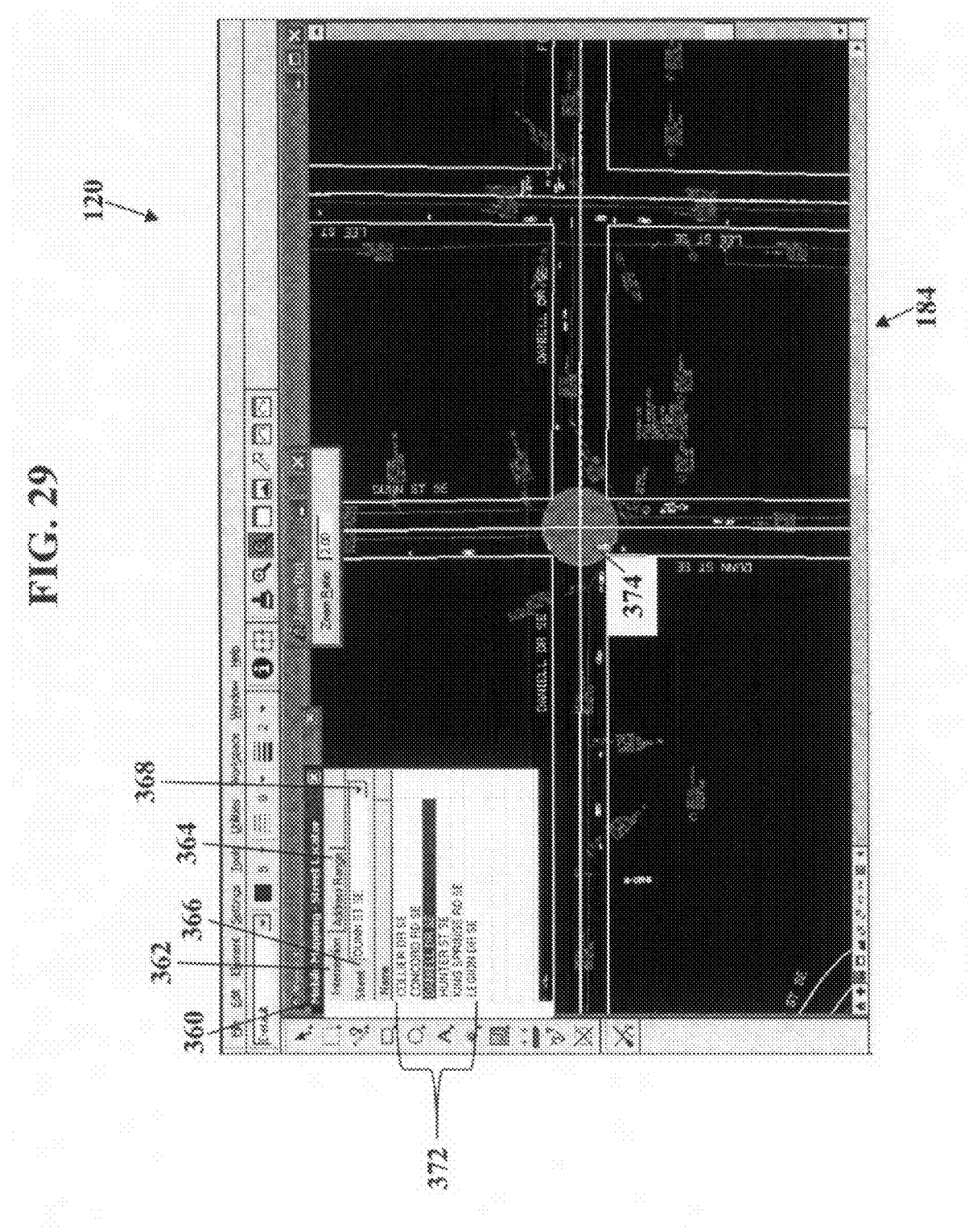

FIGS. 27-29 are screenshots illustrating a capability to search intersections, according to more exemplary embodiments. Here the user may select and map a street intersection that corresponds to the current wire center data set. As FIG. 27 illustrates, exemplary embodiments may produce or display a street locator dialog box 360. The street locator dialog box 360 may include an intersection tab 362 for mapping an intersection of streets. An address range tab 364 allows the user to map a range of addresses. The street locator dialog box 360 may also include street name field 366 that allows the user to input or enter a name or identifier of a street. A street control 368 may be selected to display a drop down menu 370 of street names. The menu 370 of street names may be alphabetically arranged, and the user selects or highlights the desired street name. The user may alternatively enter or type the name of the desired street, and the drop down menu 370 of street names may jump or advance in alphabetical order as each letter is entered. Once the user enters or selects the desired street name, exemplary embodiments query the source databases for all intersecting street names. As FIG. 28 illustrates, the street locator dialog box 360 then visually displays or presents a list 372 of intersecting cross streets. When the user selects or otherwise highlights a desired intersecting street, exemplary embodiments again query the source databases for mapping data. As FIG. 29 illustrates, the graphical user interface 120 then jumps or zooms to that resultant intersection. The mapped intersection may be highlighted or emphasized (such as with a colored or shaded circle, denoted as reference numeral 374) for ease of reference.

Figure 30:
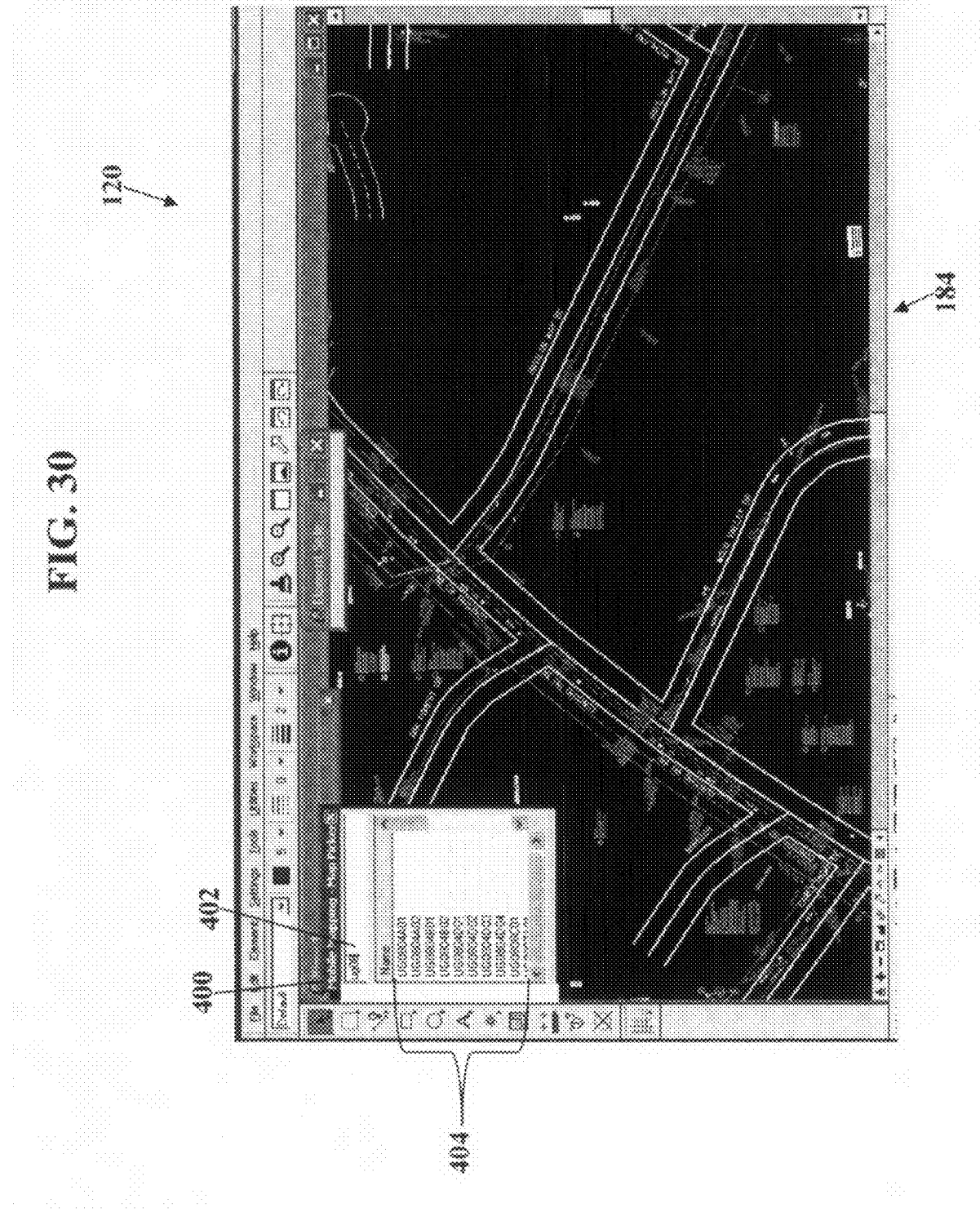
FIG. 30 is a screenshot illustrating selection of detailed plat maps, according to more exemplary embodiments.

FIG. 30 is a screenshot illustrating selection of detailed plat maps, according to more exemplary embodiments. Conventional techniques for selecting detail plats are cumbersome. Exemplary embodiments, however, allow the user to simply and quickly select and jump between different detail plat maps. FIG. 30, for example, illustrates a map picker dialog box 400. The map picker dialog box 400 may also include map name field 402 that allows the user to input or enter a name or identifier of a map (e.g., a "detail plat" in the communications industry). A drop down menu 404 of map names may be displayed. The menu 404 of map names may be alphabetically arranged, and the user selects or highlights the desired map name. The user may alternatively enter or type the name of the desired map, and the drop down menu 404 of map names may jump or advance in alphabetical order as each letter is entered. Once the user enters or selects the desired map name, exemplary embodiments query the source databases for data that corresponds to the desired map name. Exemplary embodiments then refresh or generate the graphical user interface 120 to display the selected detail plat map. Exemplary embodiments thus permit the user to simply and to quickly select and jump between different maps.

Figure 31:
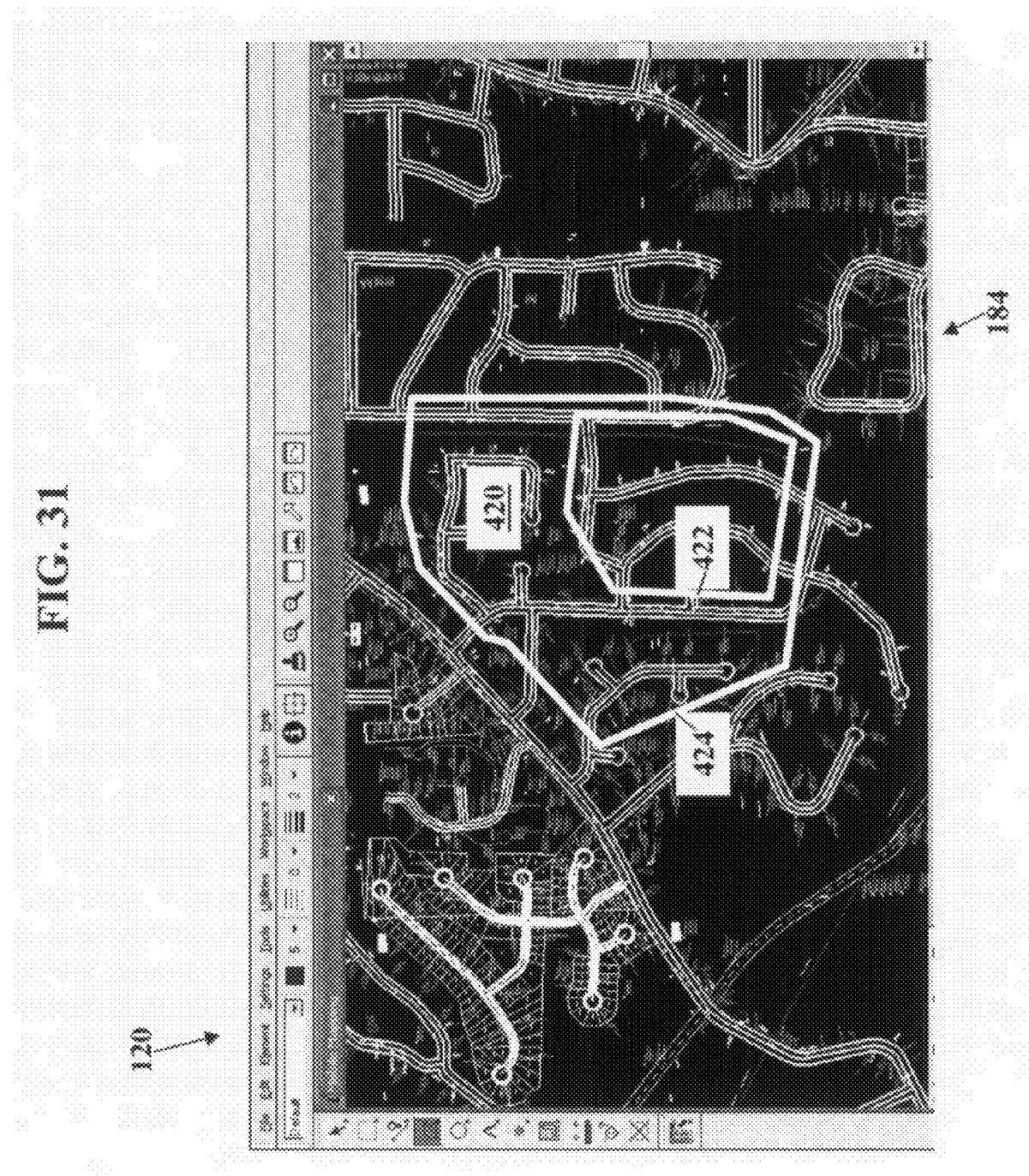
Figure 32:
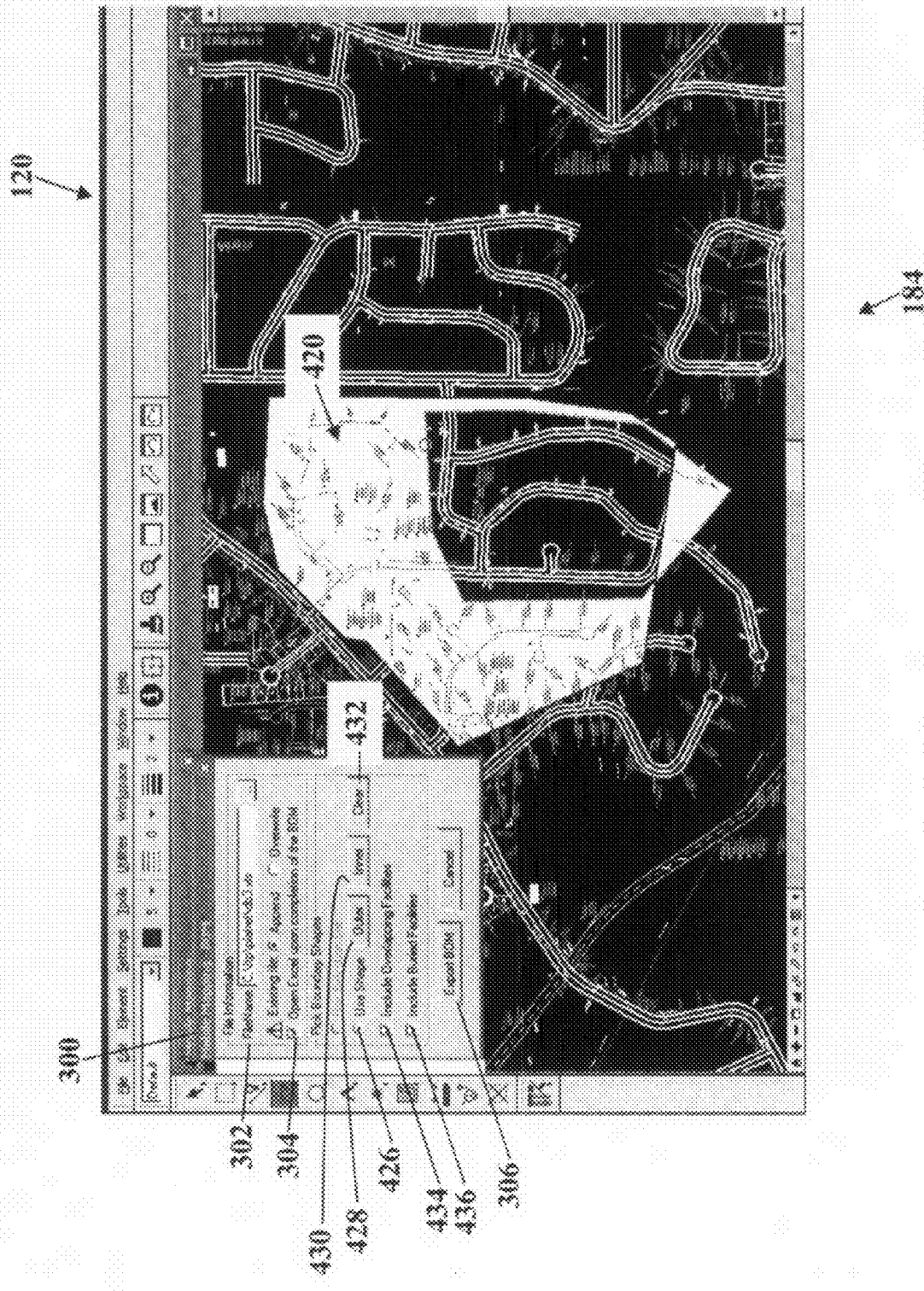
Figure 33:
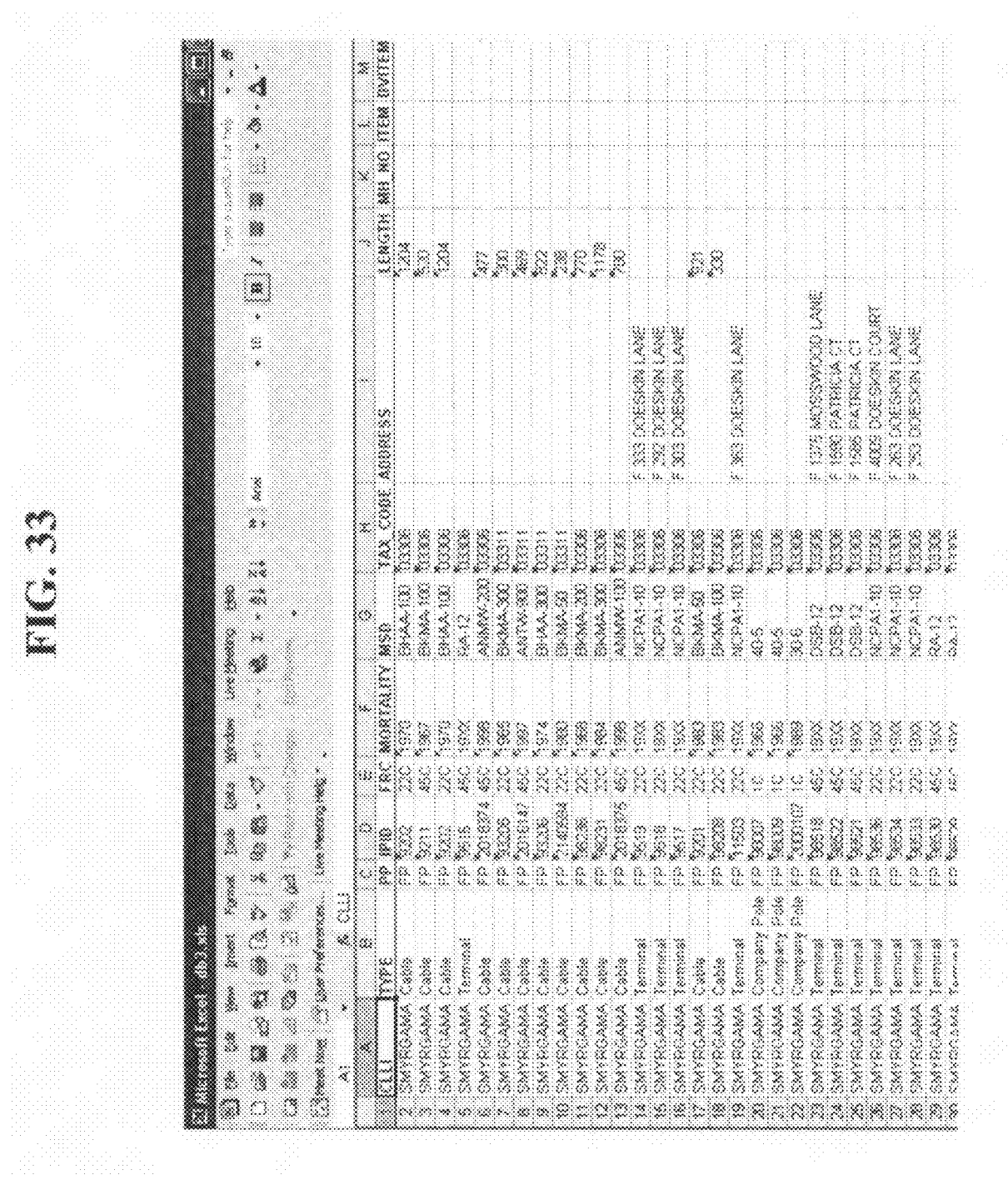

FIGS. 31-33 are screenshots illustrating capabilities for generating a geographic-specific bill of materials, according to more exemplary embodiments. Here the user may graphically define a geographic area 420, and exemplary embodiments generate a bill of materials for the geographic area 420. As FIG. 31 illustrates, the graphical user interface 120 produces a desired detail plat map (as explained with reference to FIG. 30). The user then draws or traces the geographic area 420. The user, for example, may use an input device (such as a mouse, pointer, or touch screen display) to draw the geographic area 420. The user may even define one or multiple inner and outer boundaries, such as by drawing an inner perimeter 422 and an outer perimeter 424. The geographic area 420, the inner perimeter 422, and the outer perimeter 424 are preferably closed figures (yet they may have open, undefined perimeter sections) of any shape (e.g., circular, polygonal, oval, ellipsoid). Here, then, when exemplary embodiments generate a bill of materials for the geographic area 420, exemplary embodiments may exclude the region or area defined by the inner perimeter 422. Suppose, for example, a flood occurs and the user needs to determine the impacted facilities. The outer perimeter 424 may define the flooded region, yet the inner perimeter 422 may define a region of higher ground where damage is less likely to occur. Exemplary embodiments may then determine the impacted facilities and, yet, exclude the facilities associated with the higher ground.

FIG. 32 illustrates the resultant geographic area 420. Here, also, exemplary embodiments may produce the BOM dialog box 300 (as previously explained with reference to FIG. 16). The BOM dialog box 300 may include a selectable option 426 for using defined boundary shapes. An outer control button 428 allows the user to define the outer perimeter 424, and an inner control button 430 allows the user to define the inner perimeter 422. A clear control button 432 allows the user to delete, remove, and/or redefine the inner and outer perimeters 422 and 424. When the bill of materials is generated for the geographic area 420, another selectable option 434 includes (or excludes) any overlapping facilities. Still another selectable option 436 includes (or excludes) buried facilities. When the user has defined the geographic area 420, the user selects the Export BOM control button 306 to generate the bill of materials. FIG. 33 illustrates the outputted bill of materials.

Figure 34:
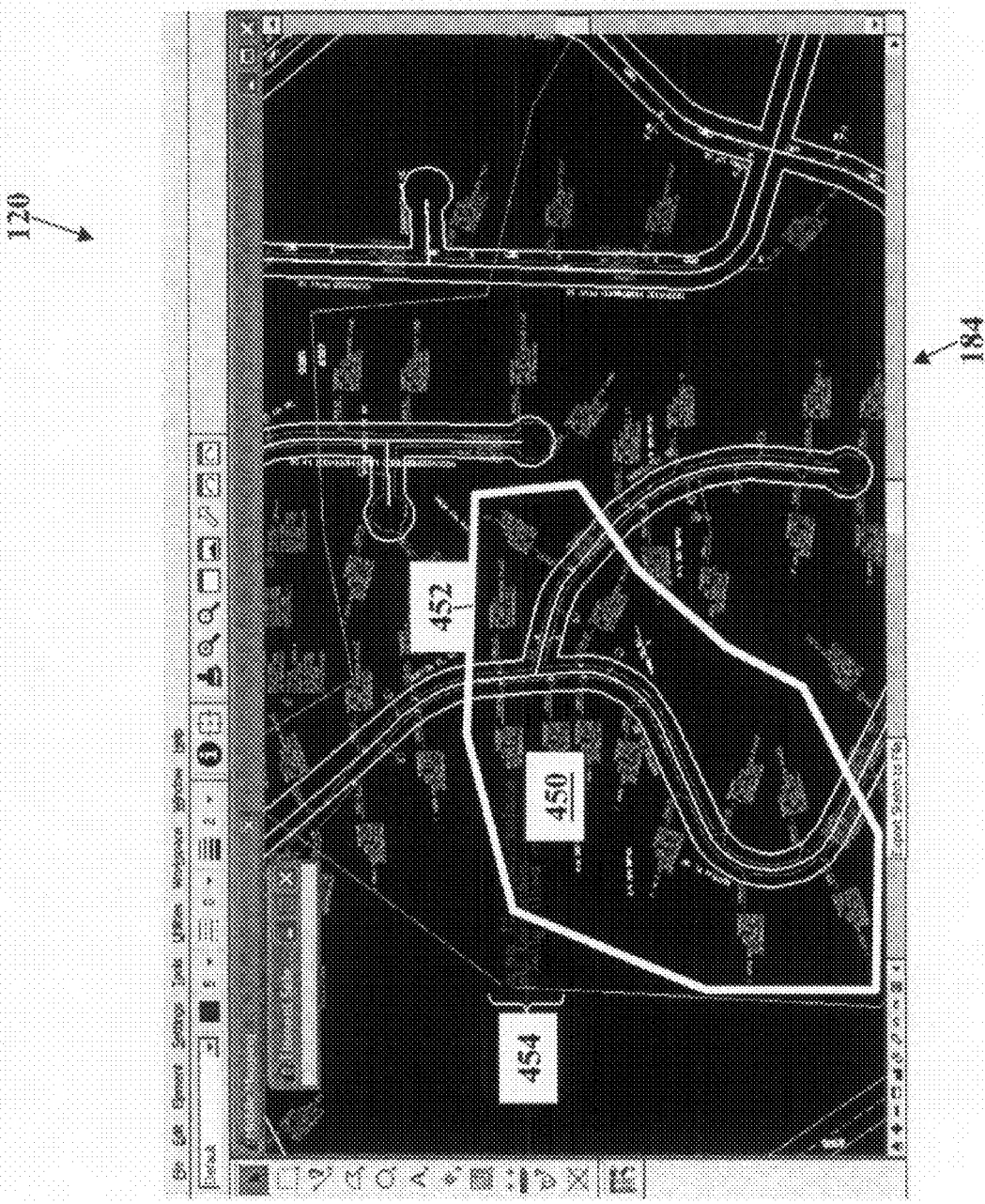
FIGS. 34 and 35 are screenshots illustrating capabilities for annotating an area of interest, according to more exemplary embodiments.
Figure 35:
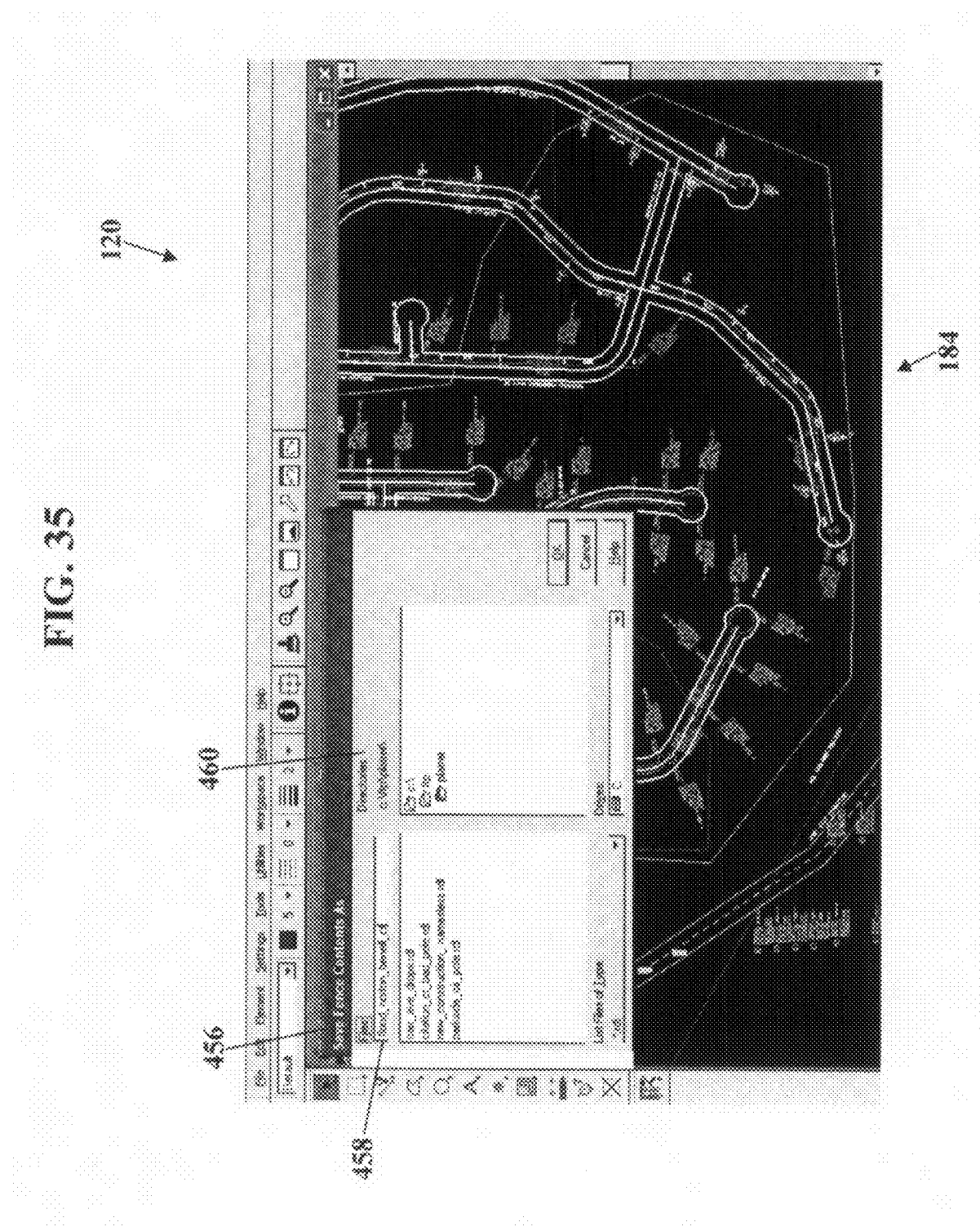

FIGS. 34 and 35 are screenshots illustrating capabilities for annotating an area of interest, according to more exemplary embodiments. When the graphical user interface 120 produces a desired detail plat map (as explained with reference to FIG. 30), the user may draw, trace, or otherwise graphically define an area 450 of interest (such as the geographic area 420 described above). The area 450 of interest is defined by a "fence" or boundary perimeter 452. Exemplary embodiments then permit the user to annotate the area 450 of interest. The user, for example, may add notes, explanations, or commentary on any geographic feature, facility, and/or equipment within, outside, or in the vicinity of the area 450 of interest. The annotations 454 are captured and stored in an annotation file. The annotation file contains the coordinates of the boundary perimeter 452 and the associated annotations 454. FIG. 35 illustrates a save dialog box 456 from which the user may specify a filename 458 and directory destination 460 for the annotation file. The coordinates and the annotations, alternatively, may be merged into and stored with the detail plat map.

Figure 36:
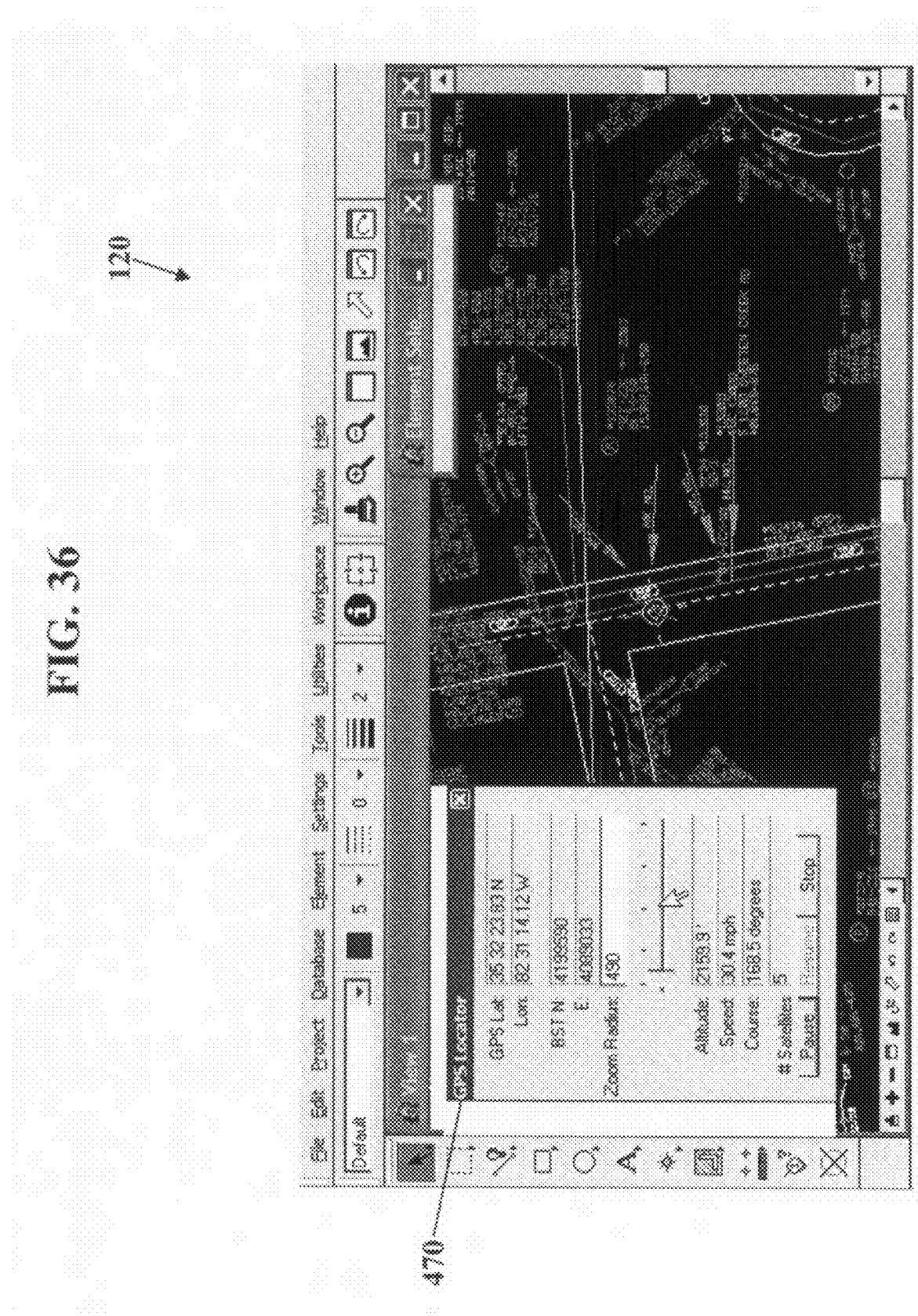
FIG. 36 is a screenshot illustrating GPS capabilities, according to more exemplary embodiments.

FIG. 36 is a screenshot illustrating GPS capabilities, according to more exemplary embodiments. When the server-side mapping application 108 and/or the client-side mapping application 114 has access to location data, exemplary embodiments may include location-based information. The user device 100, for example, may interface with a location system, such as a Global Positioning System unit. When exemplary embodiments have access to GPS location coordinates, exemplary embodiments may automatically cause the graphical user interface 120 to scroll and/or zoom to the current location of the user device 100. That is, as field personnel drive in a service vehicle, for example, exemplary embodiments cause the graphical user interface 120 to scroll and to display the current location of the service vehicle (supposing, of course, that the user device 100 is installed within, or proximate to, the service vehicle).

Exemplary embodiments may cause display of a GPS Locator dialog box 470. The GPS Locator dialog box 470 presents the current location (e.g., latitude and longitude), speed, altitude, and other location-based information. Here, however, exemplary embodiments also cause the graphical user interface 120 to present facilities information in the vicinity of the current location. As field personnel drive, exemplary embodiments query the source databases to retrieve facilities and equipment information associated with, or in the vicinity of, the current location. Exemplary embodiments thus generate a mapping of the facilities and equipment to the current location.

Figure 37:
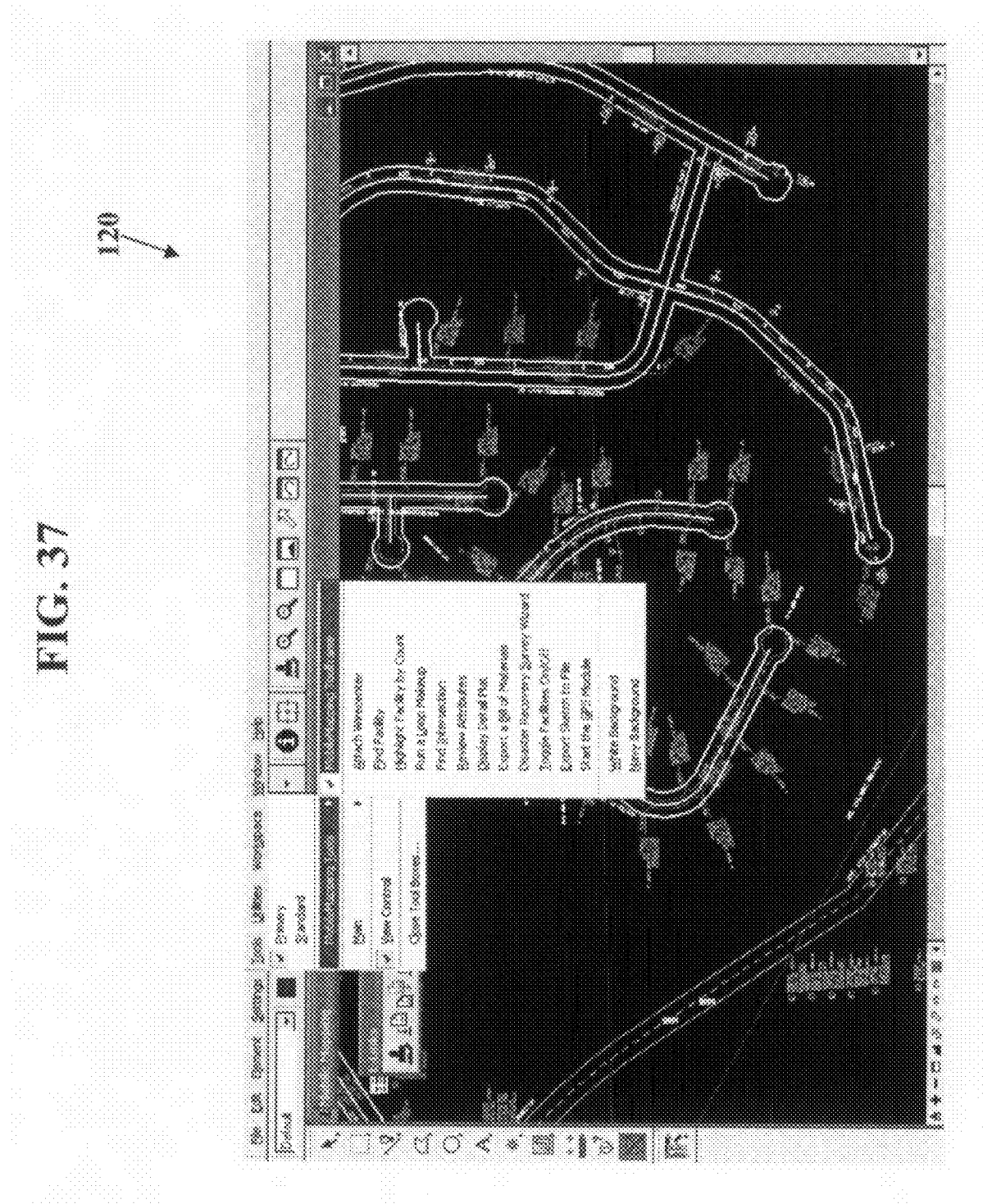
FIGS. 37 and 38 are screenshots illustrating additional features, according to more exemplary embodiments.
Figure 38:
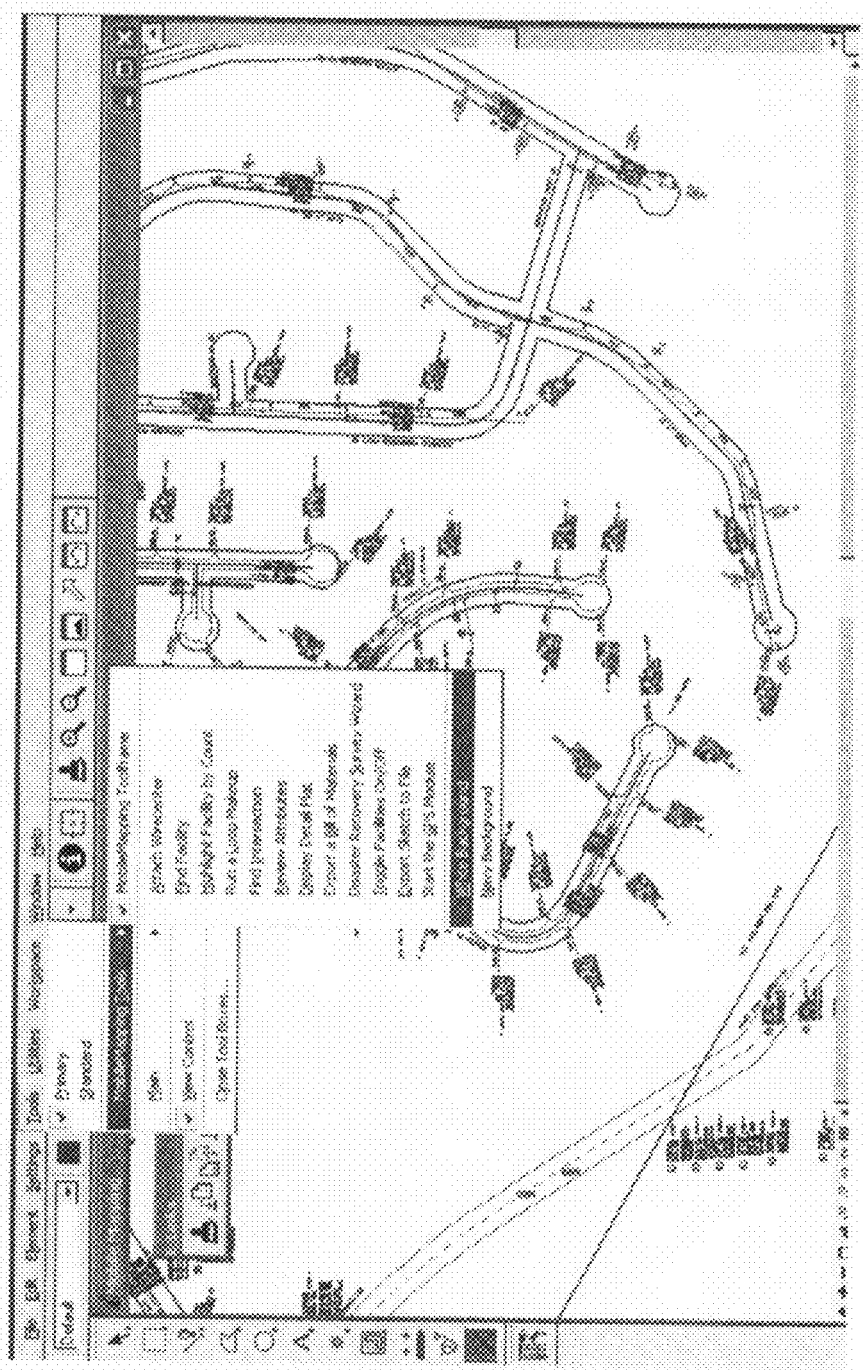

FIGS. 37 and 38 are screenshots illustrating additional features, according to more exemplary embodiments. FIG. 37 illustrates the ease of access to all the features discussed above. All the features discussed above are readily accessed from a menu of options. Selection of any option in the menu of options provides quick access to any of the features. Icons may also provide even quicker access to any of the functions. FIG. 38 illustrates customization features for changing a background color of the graphical user interface 120. Different background colors may be offered to support better viewing capabilities based on screen capabilities or properties, based on equipment, and/or based on lighting conditions (e.g., outdoor brightness).

Exemplary embodiments may utilize any programming language. The client-side mapping application 114 and/or the server-side mapping application 108, for example, may be a menu driven BRIO®, ORACLE®, and/or HYPERION® application that accesses the mobile mapping database 118 and/or with the additional databases 140. Exemplary embodiments may utilize BRIOQUERY® database queries, MICROSOFT® Access® applications, and/or MICROSOFT® Excel® spreadsheets to provide a suite of tools that produce improved mapping and facilities detail.

Figure 39:
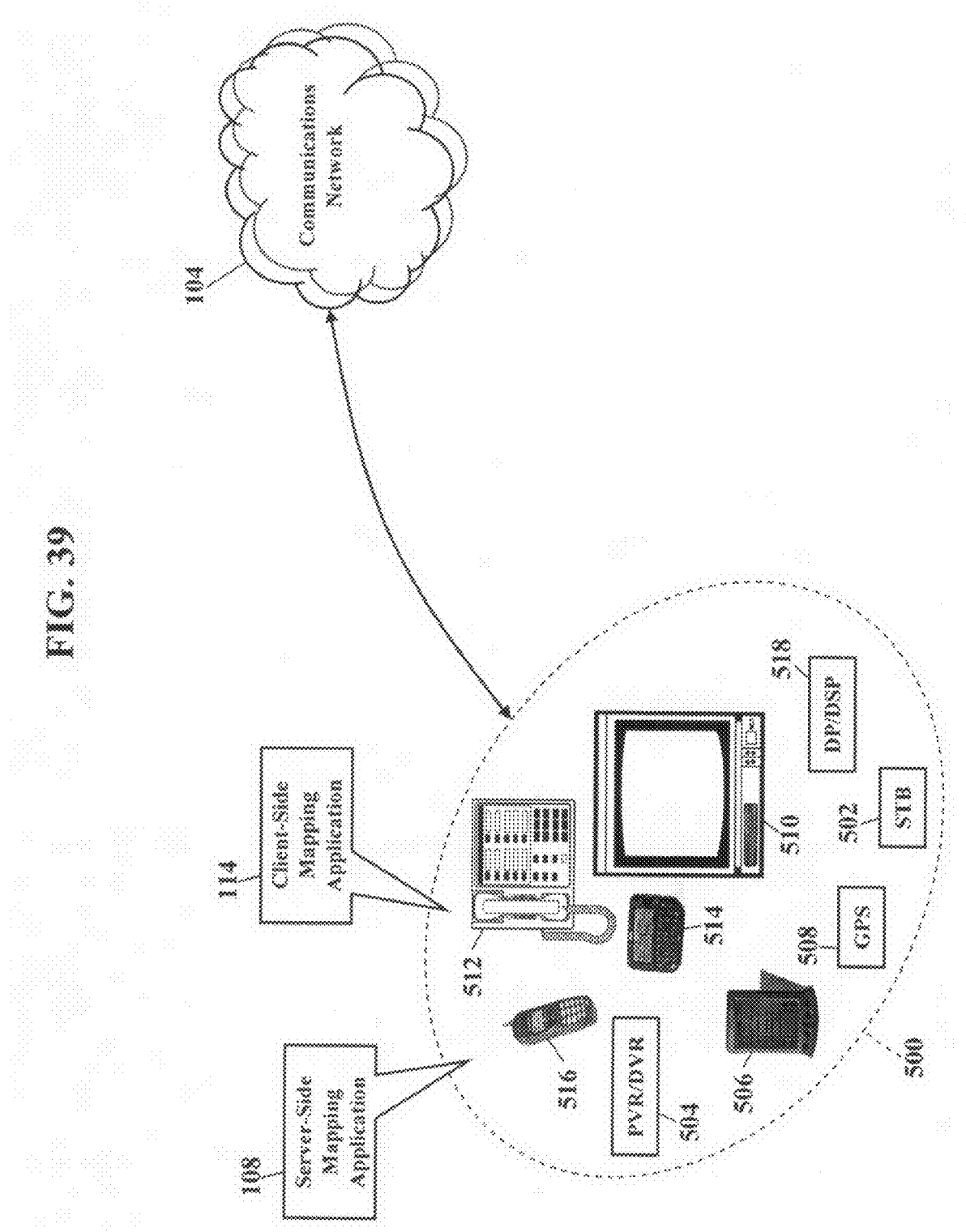
FIG. 39 depicts other possible operating environments for additional aspects of the exemplary embodiments.

FIG. 39 depicts other possible operating environments for additional aspects of the exemplary embodiments. FIG. 39 illustrates that the client-side mapping application 114 and/or the server-side mapping application 108 may alternatively or additionally operate within various other devices 500. FIG. 39, for example, illustrates that the client-side mapping application 114 and/or the server-side mapping application 108 may entirely or partially operate within a set-top box (502), a personal/digital video recorder (PVR/DVR) 504, personal digital assistant (PDA) 506, a Global Positioning System (GPS) device 508, an interactive television 510, a video-capable (e.g., Apple's iPhone™) phone 512, a pager 514, a cellular/satellite phone 516, or any computer system and/or communications device utilizing a digital processor and/or a digital signal processor (DP/DSP) 518. The device 500 may also include watches, radios, vehicle electronics, clocks, printers, gateways, and other apparatuses and systems. Because the architecture and operating principles of the various devices 500 are well known, the hardware and software componentry of the various devices 500 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known Subscriber Identity Modules, Functional Characteristics (GSM 02.17 V3.2.0 (1995-01))"; the GSM Standard 11.11, formally known as Specification of the Subscriber Identity Module—Mobile Equipment (Subscriber Identity Module—ME) interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Figure 40:
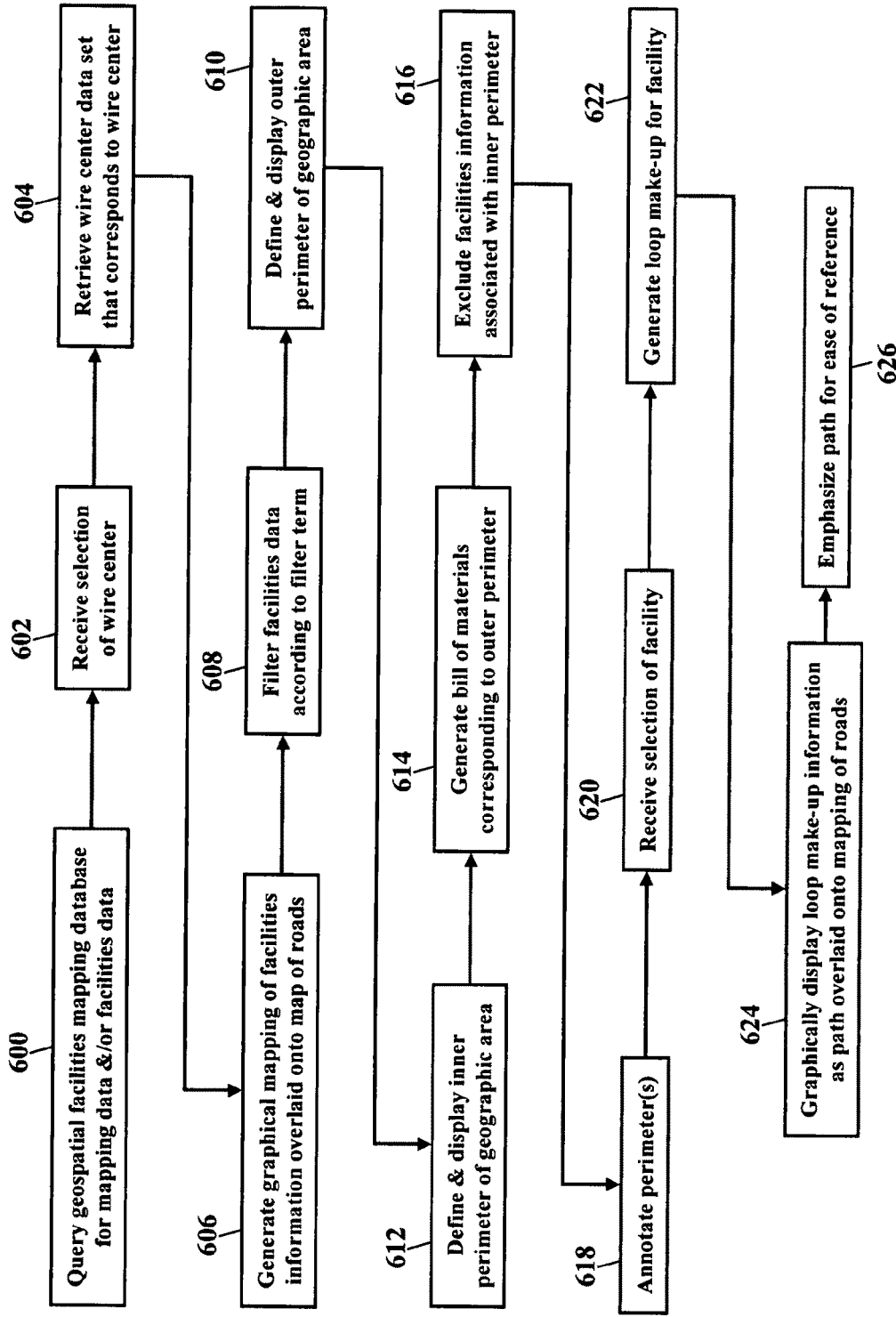
FIG. 40 is a flowchart illustrating a method of mapping facilities data, according to even more exemplary embodiments.

FIG. 40 is a flowchart illustrating a method of mapping facilities data, according to even more exemplary embodiments. A geospatial facilities mapping database may be queried for mapping data and/or facilities data (Block 600). A selection of a wire center may be received (Block 602), and a wire center data set, corresponding to the selected wire center, is retrieved (Block 604). A graphical mapping of facilities information, overlaid onto a map of roads, is generated and displayed (Block 606). The facilities information may be filtered according to a filter term (Block 608). An outer perimeter of a geographic area may be defined and displayed (Block 610). An inner perimeter for the geographic area may also be defined and displayed (Block 612). A bill of materials that corresponds to the outer perimeter is then generated (Block 614), and the bill of materials may exclude facilities information associated with the inner perimeter (Block 616). The inner and/or the outer perimeter may be annotated (Block 618). A selection of a facility may be received (Block 620) and loop make-up information for the selected facility is generated (Block 622). The loop make-up information may be graphically displayed as a path overlaid onto the mapping of roads (Block 624). The path may be emphasized for ease of reference (Block 626).

Exemplary embodiments may be physically embodied on or in a computer-readable media. This computer-readable media may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable media may be distributed to end-subscribers, licensees, and assignees. These types of computer-readable media, and other types not mention here but considered within the scope of the exemplary embodiments. A computer program product comprises processor-executable instructions for mapping facilities data.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
generating and causing display of a graphical mapping of facilities information overlaid onto a map of roads;
defining an outer perimeter of a geographic area;
displaying the outer perimeter in the graphical mapping;
receiving a selection of a facility displayed in the graphical mapping;
generating loop make-up information for the facility;
graphically displaying the loop make-up information as a path overlaid onto the mapping of roads;
emphasizing the path for ease of reference;
generating a bill of materials that corresponds to the outer perimeter; and
outputting the bill of materials.

2. The method of claim 1, further comprising defining an inner perimeter for the geographic area and displaying the inner perimeter in the graphical mapping.

3. The method of claim 2, wherein generating the bill of materials comprises excluding from the bill of materials any facilities information associated with the inner perimeter.

4. The method of claim 1, further comprising annotating the outer perimeter.

5. The method of claim 1, further comprising querying a geospatial facilities mapping database to generate the graphical mapping.

6. The method of claim 1, further comprising retrieving a wire center data set that corresponds to a selected wire center.

7. The method of claim 6, further comprising filtering from the wire center data set information associated with at least one of aerial facilities, buried facilities, and cellular towers.

8. The method of claim 6, further comprising filtering from the wire center data set information associated with at least one of copper wire equipment, fiber optic equipment, manholes, utility poles, conduits, and annotations.

9. The method of claim 6, further comprising:
retrieving multiple wire center data sets, each wire center data set corresponding to a different wire center; and
causing display of a graphical user interface having multiple views, with each view corresponding to one of the multiple wire center data sets, such that upon selection of a particular view, a corresponding wire center data set is displayed.

10. The method of claim 1, further comprising querying for a name of a facility and retrieving facility information associated with the name of the facility.

11. The method of claim 10, further comprising scrolling the graphical mapping to a location associated with the facility information.

12. The method of claim 1, further comprising querying for a name of equipment and retrieving equipment information associated with the name of the equipment.

13. The method of claim 12, further comprising scrolling the graphical mapping to a location associated with the equipment information.

14. The method of claim 1, further comprising querying for a work order and retrieving work order information associated with the work order.

15. The method of claim 1, further comprising causing display of a map designation associated with a candidate.

16. The method of claim 15, further comprising causing display of attributes associated with the candidate.

17. A system, comprising:
a processor executing code stored in memory that causes the processor to:
generate and cause display of a graphical mapping of facilities information overlaid onto a map of roads;
define a closed, outer perimeter of a geographic area;
display the outer perimeter in the graphical mapping;
define a closed, inner perimeter within the geographic area;
display the inner perimeter in the graphical mapping;
display a graphical user interface with options to exclude overlapping facilities in the inner perimeter;
generate a bill of materials that corresponds to the outer perimeter "which is the geographic area that excludes the inner perimeter"; and
output the bill of materials.

18. A computer readable medium storing processor-executable instructions for performing a method, the method comprising:
generating and displaying a graphical mapping of facilities information overlaid onto a map of roads;
displaying a count finder dialog box in a graphical user interface;
receiving a selection of a cable name from a menu of cable identifiers;
querying for a cable count associated with the cable name and displaying a listing of candidates associated with the cable count;
displaying a listing of cable candidate identifiers, each entry in the listing of cable candidate identifiers further identifying candidate cables;
receiving a selection of an entry in the listing of cable candidate identifiers;

highlighting the entry in a graphical user interface that displays a selected candidate;

generating a bill of materials that corresponds to the selected candidate; and outputting the bill of materials.

* * * * *